United States Patent
Nishikawa et al.

[11] Patent Number: 5,869,949
[45] Date of Patent: Feb. 9, 1999

[54] CHARGING APPARATUS AND CHARGING SYSTEM FOR USE WITH AN UNSTABLE ELECTRICAL POWER SUPPLY

[75] Inventors: Tsutomu Nishikawa, Chigasaki; Isao Hayashi, Yokohama, both of Japan

[73] Assignee: Canon Kabushiki Kaisha, Tokyo, Japan

[21] Appl. No.: 941,482

[22] Filed: Oct. 1, 1997

[30] Foreign Application Priority Data

Oct. 2, 1996 [JP] Japan .................................. 8-279855
Dec. 11, 1996 [JP] Japan .................................. 8-346536

[51] Int. Cl.$^6$ ................................................. H01M 10/46
[52] U.S. Cl. ........................................... 320/101; 320/125
[58] Field of Search .................................... 320/101, 125, 320/128, 160, 162, 163, 120, 121, 138, DIG. 10; 136/243, 291, 293; 323/906

[56] References Cited

U.S. PATENT DOCUMENTS

| | | | |
|---|---|---|---|
| 4,134,057 | 1/1979 | Portmann | 320/102 |
| 4,604,567 | 8/1986 | Chetty | 323/299 |
| 5,396,164 | 3/1995 | Anegawa | 320/143 |
| 5,621,300 | 4/1997 | Sato et al. | 320/101 |

*Primary Examiner*—Edward H. Tso
*Attorney, Agent, or Firm*—Fitzpatrick, Cella, Harper & Scinto

[57] ABSTRACT

When charging current is switched, the output voltage from the solar cell, namely an input voltage to a charging apparatus, changes, and controlling the input voltage to the charging apparatus does not operate correctly. Furthermore, when charging current decreases in response to a drop of the output voltage from the solar cell, a fully-charged state of the secondary cell is erroneously detected. Still further, when the charging operation is completed in accordance with a timer after charging the secondary cell by a small charging current, the secondary cell is not fully charged. To correct these problems, the input voltage Vin is compared to a voltage value V1, and, if a state in which Vin is higher than V1 (Vin>V1) is moved to a state in which Vin is equal or lower than the V1 (Vin≦V1), a charge mode which supplies small charging current starts, thereafter, the charging current is increased for a short period of time at a predetermined time interval, and then, on the basis of a comparison result between Vin and V1 at this time, the subsequent charge mode is controlled. The charged amount of the secondary cell is obtained by measuring the charging current, and the fully-charged state of the secondary battery is determined on the basis of the obtained charged amount.

27 Claims, 20 Drawing Sheets

CHARGING APPARATUS AND CHARGING SYSTEM FOR USE WITH AN UNSTABLE ELECTRICAL POWER SUPPLY

BACKGROUND OF THE INVENTION

The present invention relates to a charging apparatus and a charging system and, more particularly, to a charging apparatus and a charging system for charging a secondary cell using an unstable electric power supply, such as a solar cell, which generates variable voltage, and for properly detecting the fully-charged state of the secondary cell.

A charging apparatus for charging a secondary cell, such as a lithium ion battery, using an unstable electric power supply, such as a solar cell, compares an output voltage from the solar cell to a reference voltage, then starts or stops charging on the basis of the comparison result, since the output voltage from the solar cell changes. Further, the charging apparatus also detects a fully-charged state of a secondary cell based on a decrease in an amount of charging current and a timer, similar to a charging apparatus for charging a secondary cell at a constant voltage in current-limit method using AC power supply.

In the aforesaid charging apparatus, however, there are the following problems.

First, in the aforesaid charging apparatus, the range of voltages within which a secondary cell can be charged is limited. Therefore, it is not possible to charge the secondary cell when the output voltage from the solar cell is less than a reference voltage due to weather conditions, such as when clouds block insolation, for example. Second, when the output voltage from the solar cell changes rapidly, starting and/or stopping charging operation causes further change in the output voltage from the solar cell. Under this situation, a function for supervising an input voltage (output voltage from the solar cell) to the charging apparatus may not operate correctly.

Further, in the aforesaid charging apparatus, when charging current decreases in response to a drop of output voltage from the solar cell, fully-charged state of the secondary cell may be erroneously detected. Furthermore, when the charging operation is finished in accordance with the timer after charging the secondary cell by a smaller charging current than expected, the secondary cell may not be fully charged.

SUMMARY OF THE INVENTION

The present invention has been made in consideration of the above situation, and has as its object to prevent a supervising function for supervising input voltage from operating improperly when the charging current charges in response to change in the input voltage to a charging apparatus.

It is another object of the present invention to properly judge a charged condition of a secondary cell when the input voltage to the charging apparatus changes and to charge the secondary cell to a fully-charged state.

According to the present invention, the foregoing objects are attained by providing a charging apparatus for charging a secondary cell by electric power supplied from an unstable electric power supply, the apparatus comprising: comparison means for comparing a voltage Vin supplied from the unstable electric power supply to a first predetermined voltage V1; a regulator for supplying electric power to the secondary cell after controlling the voltage or the current of the electric power supplied from the unstable electric power supply; and control means for controlling the operation of the regulator on the basis of the voltage and the current to be supplied to the secondary cell, wherein the regulator has a first charge mode for providing a small current to the secondary cell and a second charge mode for providing a large current to the secondary cell, and wherein, if a comparison result by the comparison means is Vin≦V1, the regulator operates in the first charge mode, thereafter, the control means controls the regulator to operate in the second charge mode for a short period of time at a predetermined time interval, and, if a comparison result by the comparison means after that short period is Vin>V1, then the control means controls the regulator to operate in the second mode.

Further, the foregoing objects are attained by providing a charging apparatus for charging a secondary cell by electric power supplied from an unstable electric power supply, the apparatus comprising: comparison means for comparing a voltage Vin supplied from the unstable electric power supply to a predetermined voltage V1; a regulator for supplying electric power to the secondary cell after controlling the voltage or the current of the electric power supplied from the unstable electric power supply; a first switch connected between the regulator and the secondary cell in series; a second switch, connected to the first switch in parallel, whose on/off is controlled by the comparison means; and control means for controlling on/off of the first switch on the basis of a comparison result by the comparison means and a charged state of the secondary cell, wherein, if a comparison result by the comparison means is Vin<V1, then the first switch is opened and the second switch is closed, if a comparison result is Vin>V1 and it is determined that the secondary cell is not in fully-charged state, then the first switch is closed and the second switch is opened, and if a comparison result is Vin>V1 and it is determined that the secondary cell is in fully-charged state, then the first and second switches are opened.

Further, the foregoing objects are also attained by providing a charging apparatus for charging a secondary cell included in an external apparatus, by electric power supplied by an unstable electric power supply, the charging apparatus comprising: comparison means for comparing a voltage Vin supplied from the unstable electric power supply to a predetermined voltage V1; a regulator for supplying electric power to the secondary cell after controlling the voltage or the current of the electric power supplied from the unstable electric power supply; and a first switch connected between the regulator and the secondary cell in series; a second switch, connected to the first switch in parallel, whose on/off is controlled by the comparison means, wherein, if a comparison result by the comparison means is Vin≦V1, then the first switch is opened and the second switch is closed, if a comparison result is Vin>V1 and it is determined that the secondary cell is not in full-charged state, then the first switch is closed and the second switch is opened, and if a comparison result is Vin>V1 and it is determined that the secondary cell is in full-charged state, then the first and second switches are opened.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
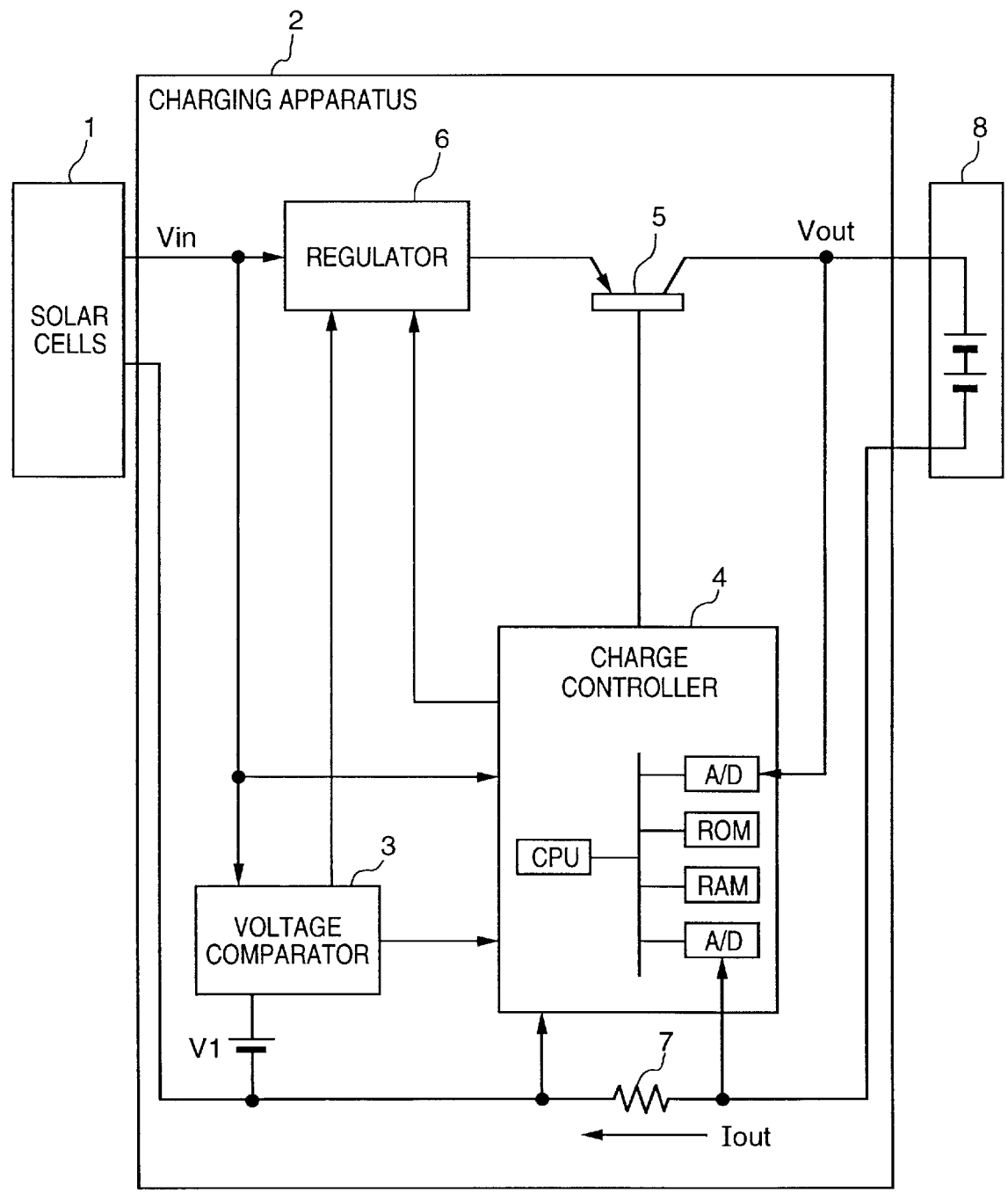
FIG. 1 is a block diagram illustrating a configuration of a charging apparatus according to a first embodiment of the present invention.

FIG. 1 is a block diagram illustrating a configuration of a charging apparatus according to a first embodiment of the present invention. In FIG. 1, reference numeral 1 denotes solar cells as an electric power supply, and reference numeral 2 denotes a charging apparatus, connected to the solar cells 1, and including a control system, and having a voltage comparator 3 for comparing an input voltage Vin to a reference voltage V1, a charge controller 4 for controlling charging operation, a switching device 5 whose on/off state is controlled by the charge controller 4, a regulator 6 for controlling charging voltage Vout and charging current Iout, and a resistor 7 provided for detecting the charging current Iout. Further, reference numeral 8 denotes a load which is the secondary cell to be charged at a constant voltage by the charging apparatus 2.

In the aforesaid configuration, the output voltage from the solar cells 1 is inputted to the charging apparatus 2, and charges the secondary cell 8 via the regulator 6 and the switching device 5. The input voltage Vin to the charging apparatus 2 is compared with the reference voltage V1 by the voltage comparator 3, and a signal indicating the comparison result is inputted to the regulator 6 and the charge controller 4.

When electric power is supplied from the solar cells 1 and the secondary cell 8 is connected, the charge controller 4 turns on the switching device 5, thereby the charging operation starts. Note, when the electric power generated by the solar cells 1 is low and the input voltage Vin is lower than the minimum voltage at which the charging can be continued, the switching device 5 is turned off.

The charge controller 4 monitors the input voltage Vin, a signal indicating the comparison result by the voltage comparator 3, the charging voltage Vout and the charging current Iout, and controls the operation of the regulator 6 and on/off state of the switching device 5 in accordance with states of the above voltages and signals.

When the input voltage Vin becomes equal or lower than the reference voltage V1 (Vin≦V1), the voltage comparator 3 sends a signal to the regulator 6. In response to the signal, the regulator 6 controls so that a small charging current Iout flows. After the charge controller 4 receives the signal, indicating that the input voltage Vin is equal or lower than the reference voltage V1 (Vin≦V1), from the voltage comparator 3, it sends signals to the regulator 6 at a predetermined time interval in order to control so that a large charging current Iout tentatively flows for a short period of time, and monitors any change in the input voltage Vin. If the charge controller 4 receives a signal, indicating that the input voltage Vin is higher than the reference voltage V1 (Vin>V1), from the voltage comparator 3 during this monitoring period, it sends a signal to the regulator 6 so that the large charging current Iout flows.

The regulator 6 operates as a constant voltage source when the load is small, whereas it operates as a constant current source when the load is large. More specifically, an output voltage value and current limit values for performing a constant-voltage charge of the secondary cell 8 are set in the regulator 6. Further, as the current limit values, two values are set in the regulator 6, and, when charging operation is started, the larger current limit value is used for charging the secondary cell 8 by the large charging current Iout (this charging operation is referred to as "charging operation 1" hereinafter). When a signal indicating Vin ≦V1 is received from the voltage comparator 3, then the secondary cell 8 starts charging with the small charging current Iout (referred to as "charging operation 2" hereinafter) starts, namely, charging operation using the smaller current limit value starts. Thereafter, the regulator 6 maintains the charging operation 2 until it receives a signal, indicating to move to the charging operation 1, from the charge controller 4.

Figure 2:
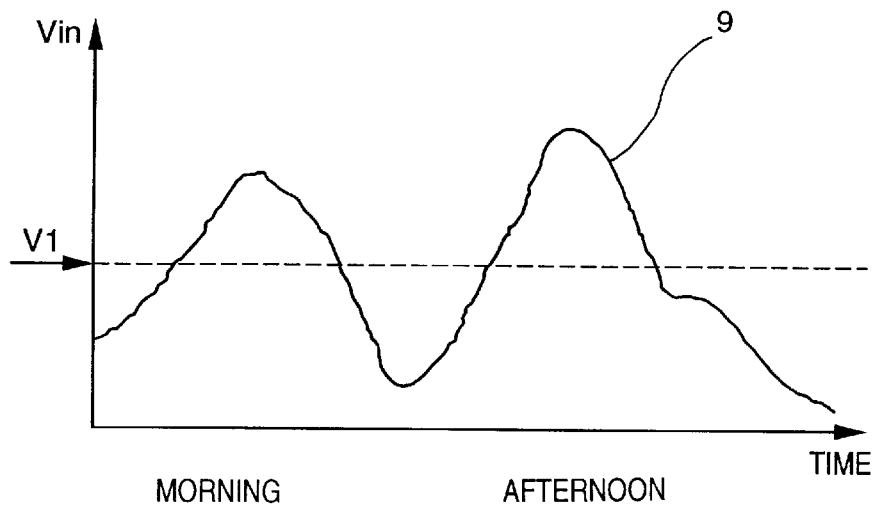
FIG. 2 is a graph showing an input voltage to the charging apparatus with respect to time.

FIG. 2 is a graph showing the input voltage Vin with respect to time. A voltage curve 9 represents the input voltage Vin fluctuating with respect to time.

Figure 3:
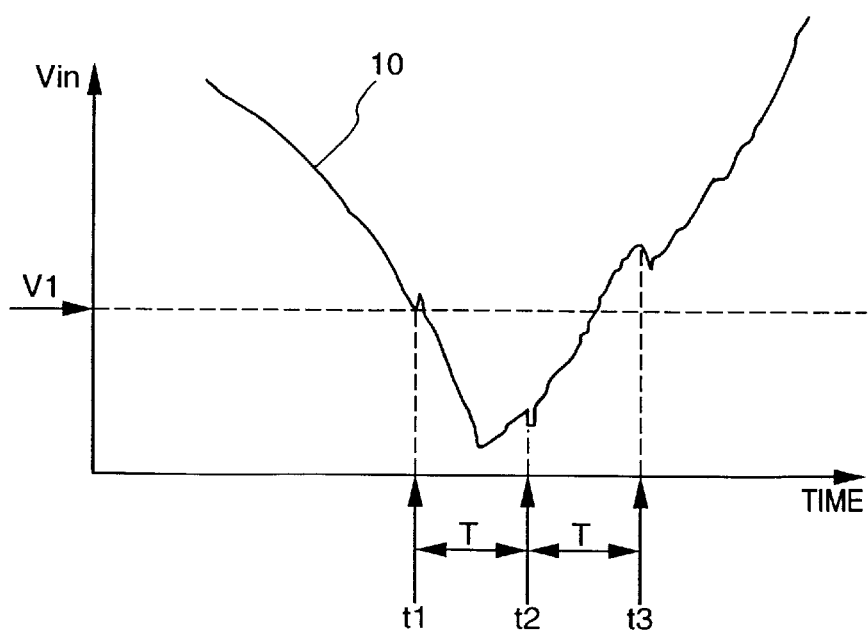
FIG. 3 is a graph of an enlarged portion of the curve of the input voltage.

FIG. 3 is a graph of an enlarged part of the voltage curve of the input voltage Vin. The voltage curve 10 shown in FIG. 3 shows that the input voltage Vin changes when the charging state of the secondary cell 8 switches. More specifically, when the input voltage Vin decreases and becomes equal or lower than the reference voltage V1, the charging operation 2 starts. As a result, the load on the solar cells 1 decreases, causing the input voltage Vin the momentarily increase;

At time t1 shown in FIG. 3, a signal indicating Vin $\leq$ V1 is sent from the voltage comparator 3 to the charge controller 4. Then, at time t2, a time period T after the time t1, the charge controller 4 controls so that a large charging current Iout flows for a short period of time and monitors the input voltage Vin. Since Vin$\leq$V1 at time t2, the charging operation 2 is maintained. At time t3, the charge controller 4 again controls so that a large charging current Iout flows for a short period of time and monitors the input voltage Vin. Since the input voltage Vin is higher than the reference voltage V1 (Vin>V1) at t3, the charge controller 4 sends a signal instructing to move to the charging operation 1 to the regulator 6.

Figure 4:
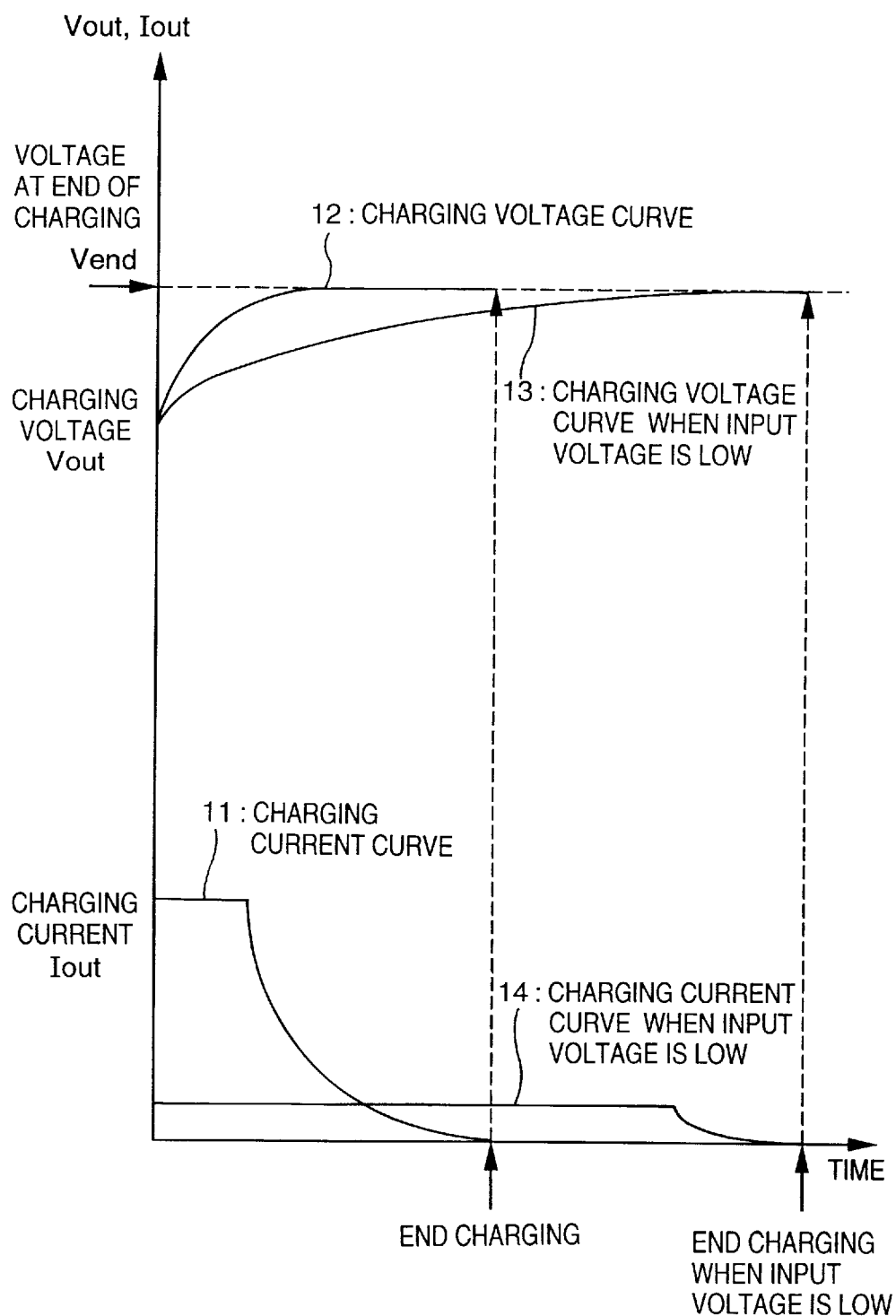
FIG. 4 shows graphs showing charging voltage and charging current with respect to time.

FIG. 4 show graphs showing changes in the charging voltage Vout and the charging current Iout, which charge the secondary cell 8, with respect to time. A charging voltage curve 12 and a charging current curve 11 correspond to the charging operation 1, and a charging voltage curve 13 and a charging current curve 14 correspond to the charging operation 2. In the charging operations 1 and 2, when the charged amount of the secondary cell 8 is small and the terminal voltage across the secondary cell 8 is low, a large charging current Iout flows. Accordingly, the regulator 6 acts as a constant current source. As the charged amount of the secondary cell 8 increases and the terminal voltage across the secondary cell 8 increases, the charging current Iout becomes less than the current limit value, and the regulator 6 acts as a constant voltage source.

The charging operation 1 indicated by the charging voltage curve 12 and the charging current curve 11 is performed before the time t1 and after the time t3 in FIG. 3, and the charging operation 2 indicated by the charging voltage curve 13 and the charging current curve 14, is performed between the time t1 and the time t3 in FIG. 3.

As shown in FIG. 4, the charging voltage Vout at the finish of the charging operation is about the same as in the charging operations 1 and 2. In both cases the voltage at that time is Vend. Further, the charging current Iout at the finish of the charging operation in the charging operation 2 is almost as small as the charging current Iout at the finish of charging operation in the charging operation 1. Therefore, even when either of these two charging operations 1 or 2 are switched on, by detecting both of the charging current Iout and the charging voltage Vout at a predetermined time interval, storing the detected charging current values and the charging voltage values, and checking the consecutive charging current values and the charging voltage values detected at more than two different times or checking the changes in the detected values, it is possible to detect whether or not the secondary cell 8 is in full-charged state. More specifically, when the values of the charging voltage Vout and the charging current Iout reach predetermined values or the changes in values of the charging voltage Vout and the charging current Iout become less than predetermined values, the charge controller 4 determines that the secondary cell 8 is fully charged, and then turns off the switching device 5, thereby ending charging operation.

Note, the value of the reference voltage V1 is set to the value of the minimum input voltage Vin at which the large charging current Iout in the charging operation 1 can be supplied to the secondary cell 8. Further, the voltage comparator 3 is preferably set to have comparison characteristics with some hysteresis. Specifically, when the input voltage Vin is decreasing toward V1, Vin is compared to V1, whereas, when the input voltage Vin is increasing toward V1, Vin is preferably compared to a voltage V1+v, which is somewhat higher than V1.

Further, the voltage comparator 3 and the regulator 6 can be configured as an analog circuit, and the charge controller 4 can be configured as a digital circuit. Furthermore, since the regulator 6 controls the charging current Iout, it is possible to easily set and prepare the charging current Iout corresponding to a change in the input voltage Vin.

Figure 21:
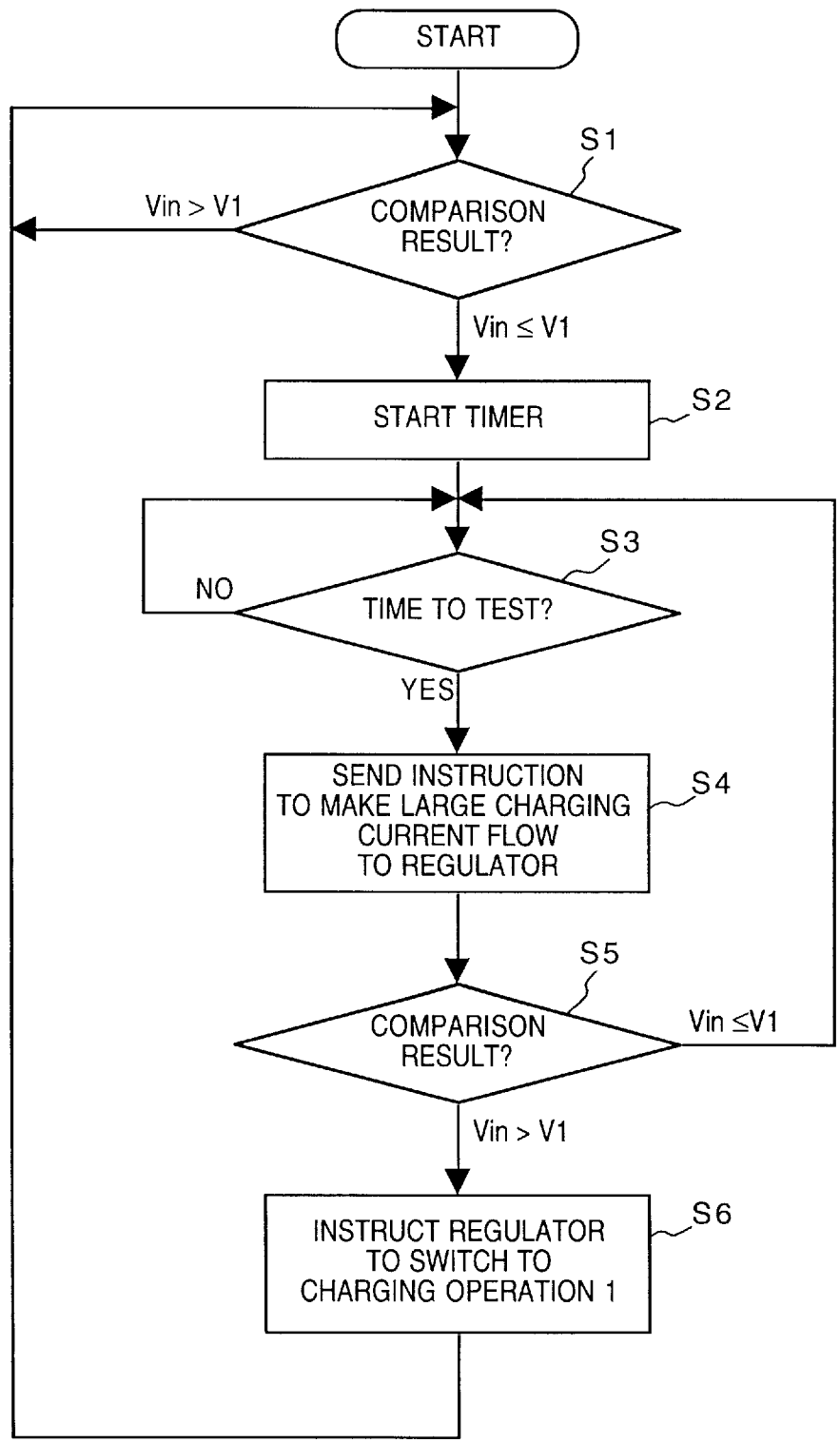
FIG. 21 is a flowchart of charging operation according to the first embodiment of the present invention.

FIG. 21 is a flowchart of charging operation of the charge controller 4.

In step S1, the comparison result by the voltage comparator 3 is judged, and, if Vin>V1, then the step S1 is repeated. If Vin$\leq$V1, then the process proceeds to step S2 where the charge controller 4 starts a timer for determining timing for controlling the regulator 6 to tentatively let the large charging current Iout flow. Note, the timer is included in a one-chip microcomputer included in the charge controller 4.

When the time to make the large charging current Iout flow, tentatively, has come in step S3, the processing moves to step S4. In step S4, the charge controller 4 sends an instruction to make the large charging current Iout flow for a short period of time, to the regulator 6. In step S5, the comparison result by the voltage comparator 3 is judged, and if Vin$\leq$V1, then the process returns to step S3 and steps S3 and S5 are repeated. Whereas, if Vin>V1, then the process proceeds to step S6 where the charge controller 4 instructs the regulator 6 to switch to the charging operation 1, then the process returns to step S1.

Second Embodiment

Figure 5:
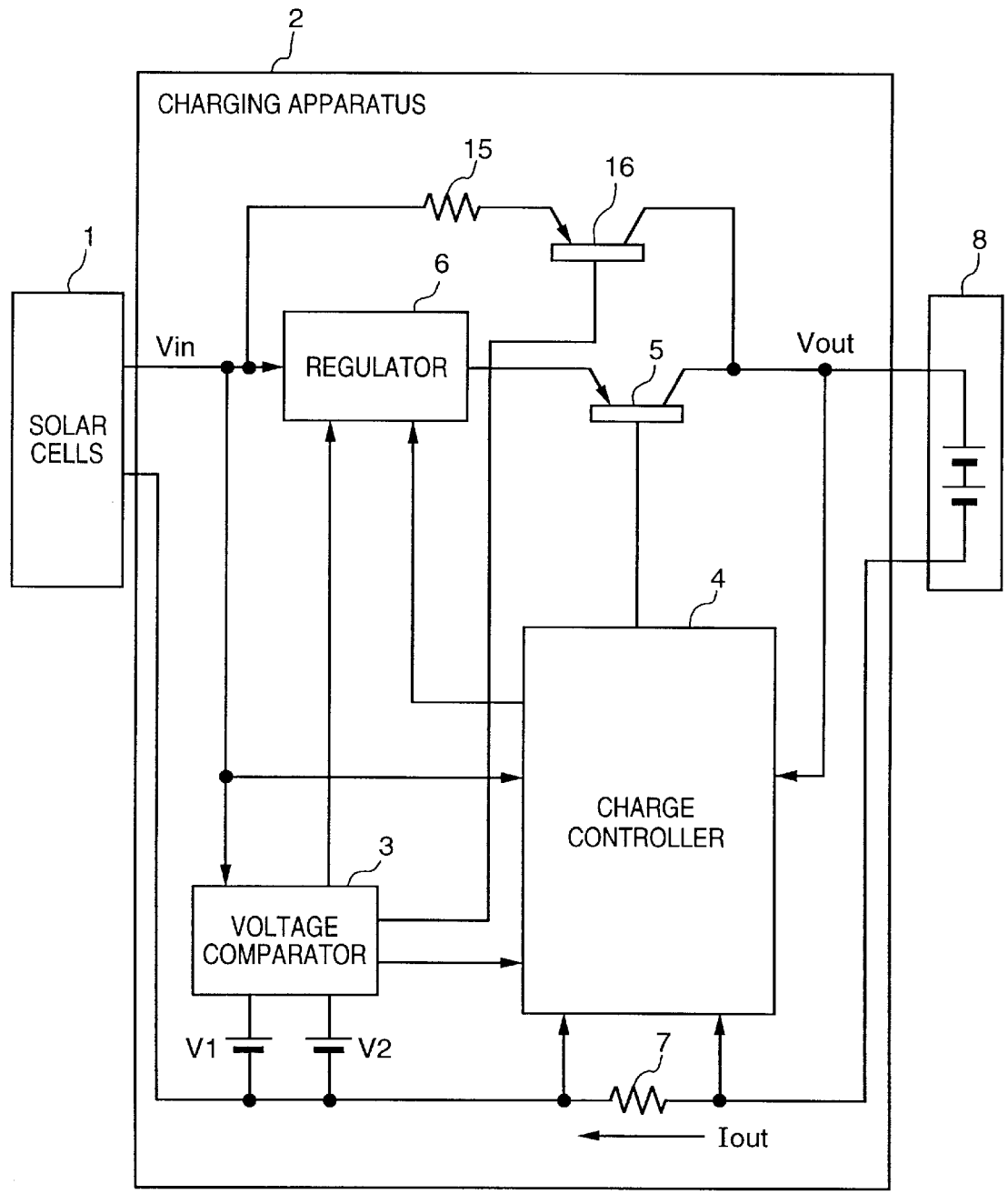
FIG. 5 is a block diagram illustrating a configuration of a charging apparatus according to a second embodiment of the present invention.

FIG. 5 is a block diagram illustrating a configuration of a charging apparatus 2 according to a second embodiment of the present invention. The charging apparatus 2 shown in FIG. 5 further includes a configuration which allows charging of the secondary cell 8 by by-passing the regulator 6 using a resistor 15 and a switching device 16, in addition to the configuration explained in the first embodiment. The switching device 16 is controlled by the voltage comparator 3. The voltage comparator 3 compares the input voltage Vin to a second reference voltage V2 (<V1 V2), and, when the input voltage Vin is equal or lower than the reference voltage V2 (Vin$\leq$V2), the voltage comparator 3 outputs a signal which turns on the switching device 16. Further, when the input voltage Vin is higher than the reference voltage V2 (Vin>V2), the voltage comparator 3 outputs a signal which turns off the switching device 16. Since the charge controller 4 turns off the switching device 5 when a signal indicating Vin$\leq$V2 is received from the voltage comparator 3, the secondary cell 8 is charged in a circuit including the solar cells 1, the resistor 15, the switching device 16, and the secondary cell 8.

The voltage comparator 3 is preferably set to have comparison characteristics with some hysteresis. More specifically, in a case where Vin increases toward V2, the input voltage Vin is compared to a voltage value V2+v, which is somewhat higher than V2.

The charging operation performed when Vin>V2 is the same as that explained in the first embodiment, therefore, its detailed explanation is omitted. Further, the resistor 15 is used for limiting the flowing amount of the charging current Iout, and its value is roughly determined in accordance with the following equation, $$R15 = \{V2 - Vb(\min)\}/I_L \quad (1)$$

Vb(min): minimum terminal voltage across the secondary cell 8
$I_L$: limit value of charging current
V2: the same voltage as the maximum charging voltage (Vend) of the secondary cell 8.

According to the second embodiment, even when the input voltage Vin decreases to a voltage level at which the regulator 6 and the charge controller 4 do not operate, the secondary cell 8 can be charged if the input voltage Vin is higher than the terminal voltage across the secondary cell 8, since the switching device 16 is turned on by the voltage comparator 3.

Especially, the solar cells 1, used as an electric power supply, have a characteristic that the output voltage increases as the load becomes small. Therefore, in the second embodiment, if the current is relatively small, the secondary cell 8 can be charged in most cases. Further, a lithium ion battery which has the characteristics of reducing charging current and charging electric power as its charged amount decreases is ideal as a secondary cell 8 to be connected and charged by the charging apparatus 2 of the second embodiment.

According to the first and second embodiments as described above, even when the output electric power from the solar cells 1 changes due to the weather condition, time, and direction of the sun with respect to the solar cells 1, for instance, it is possible to charge the secondary cell 8, i.e., the load, in a suitable charging operation depending upon the output from the solar cells 1. Further, while switching the charging operations, the secondary cell 8 can be charged properly operation with no erroneous operation regardless of a rapid change in output voltage from the solar cells 1.

Furthermore, even when the input voltage Vin changes and the charging current Iout changes under control of the charge controller 4, by detecting the values or changes in the charging voltage Vout and the charging current Iout of the secondary cell 8, the fully-charged state of the secondary cell 8 is correctly detected and charging operation can be finished.

Third Embodiment

Figure 6:
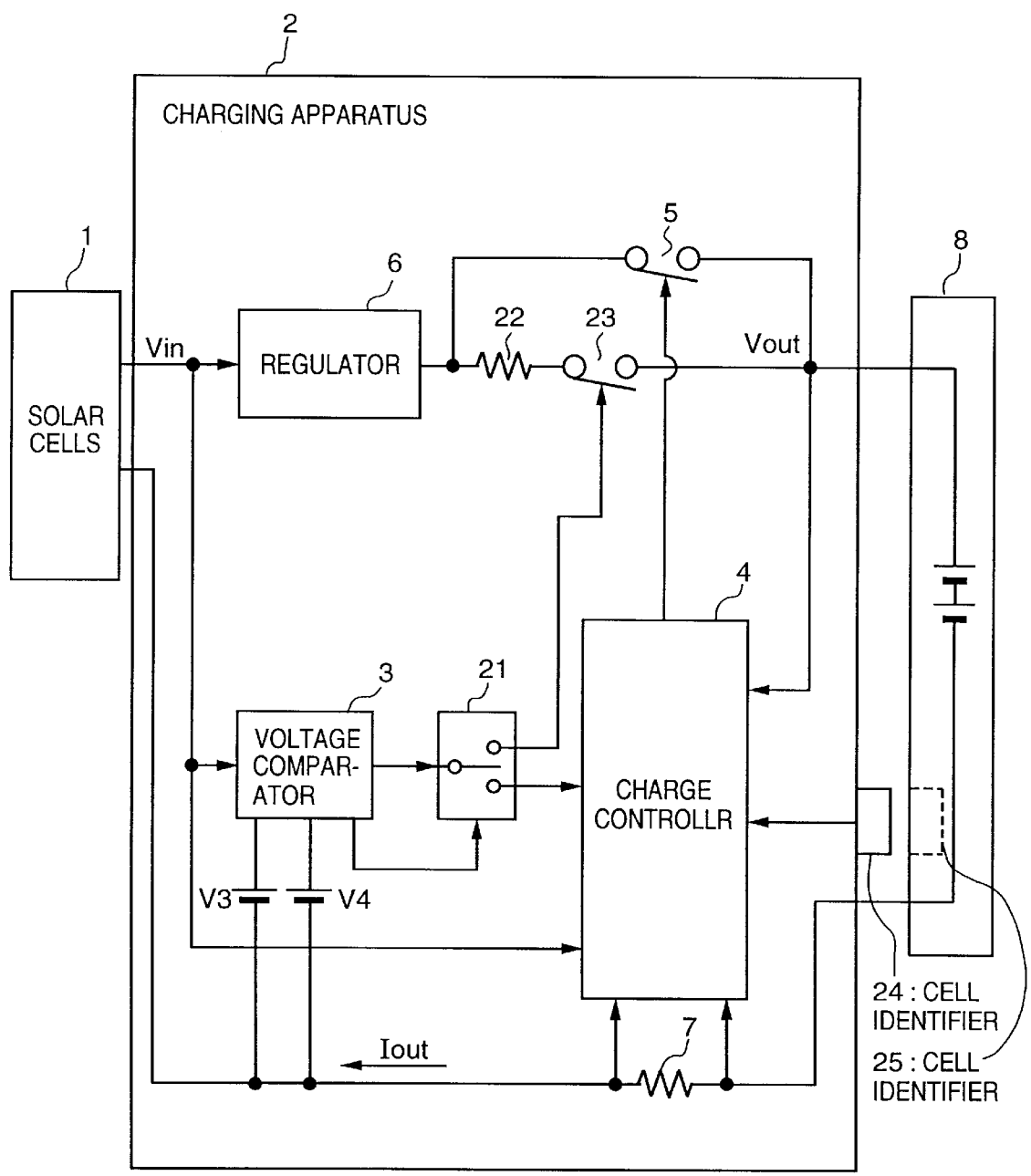
FIG. 6 is a block diagram illustrating a configuration of a charging system according to third and fourth embodiments according to the present invention.
Figure 7:
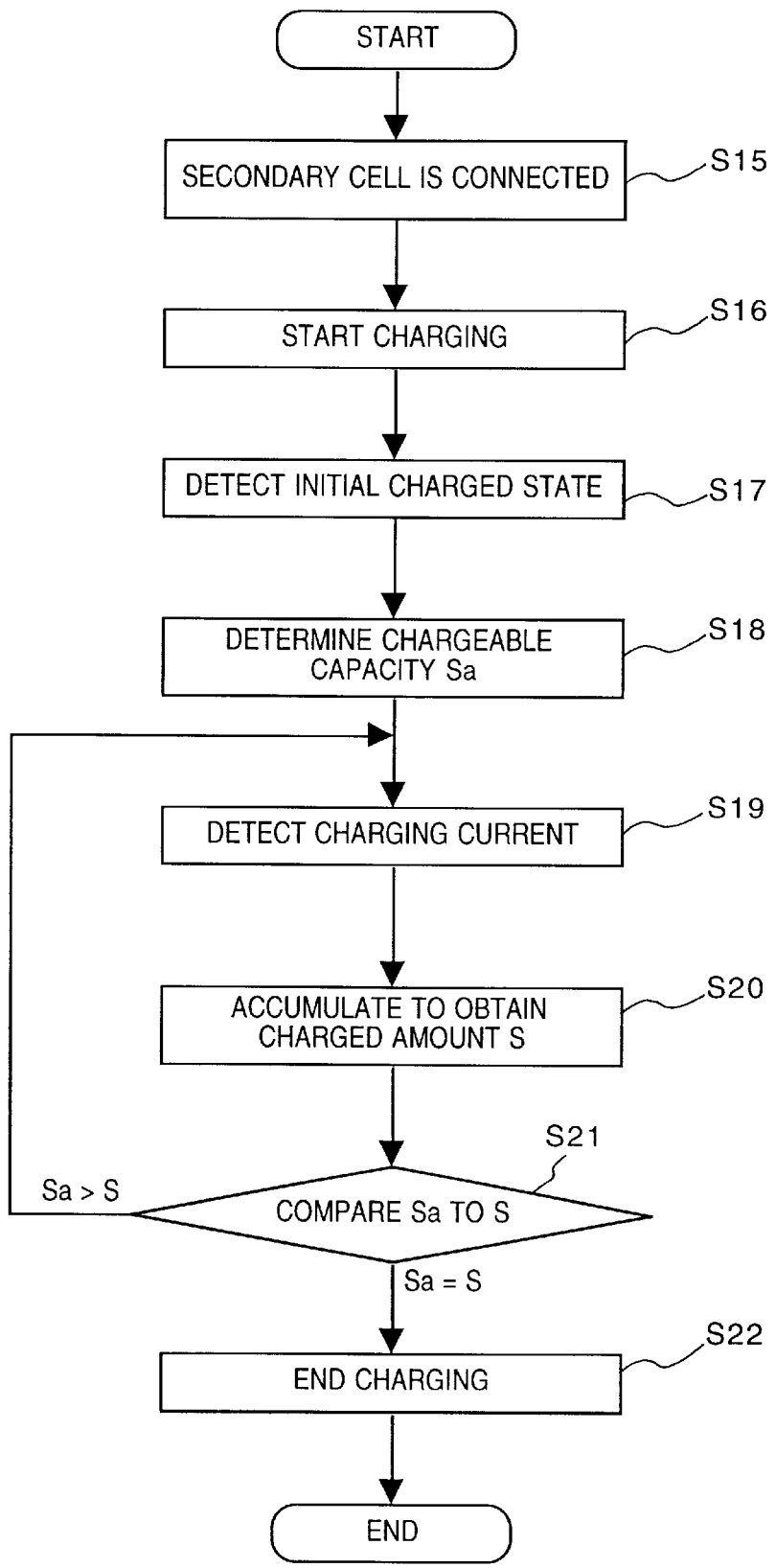
FIG. 7 is a flowchart of an operation of the charging system according to the third embodiment.
Figure 8:
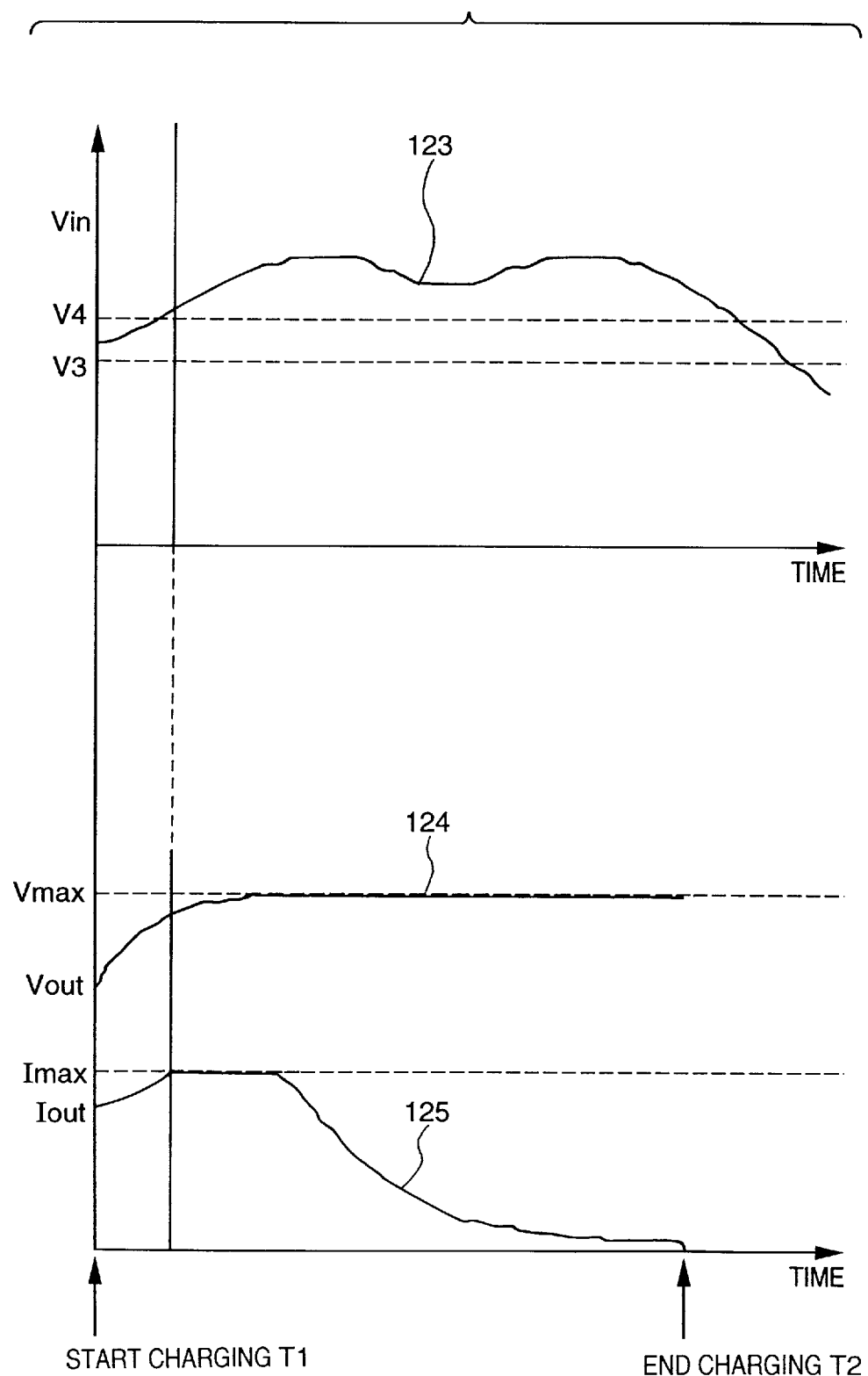
FIG. 8 shows graphs showing an example of an input voltage which does not affected a charged state.
Figure 9:
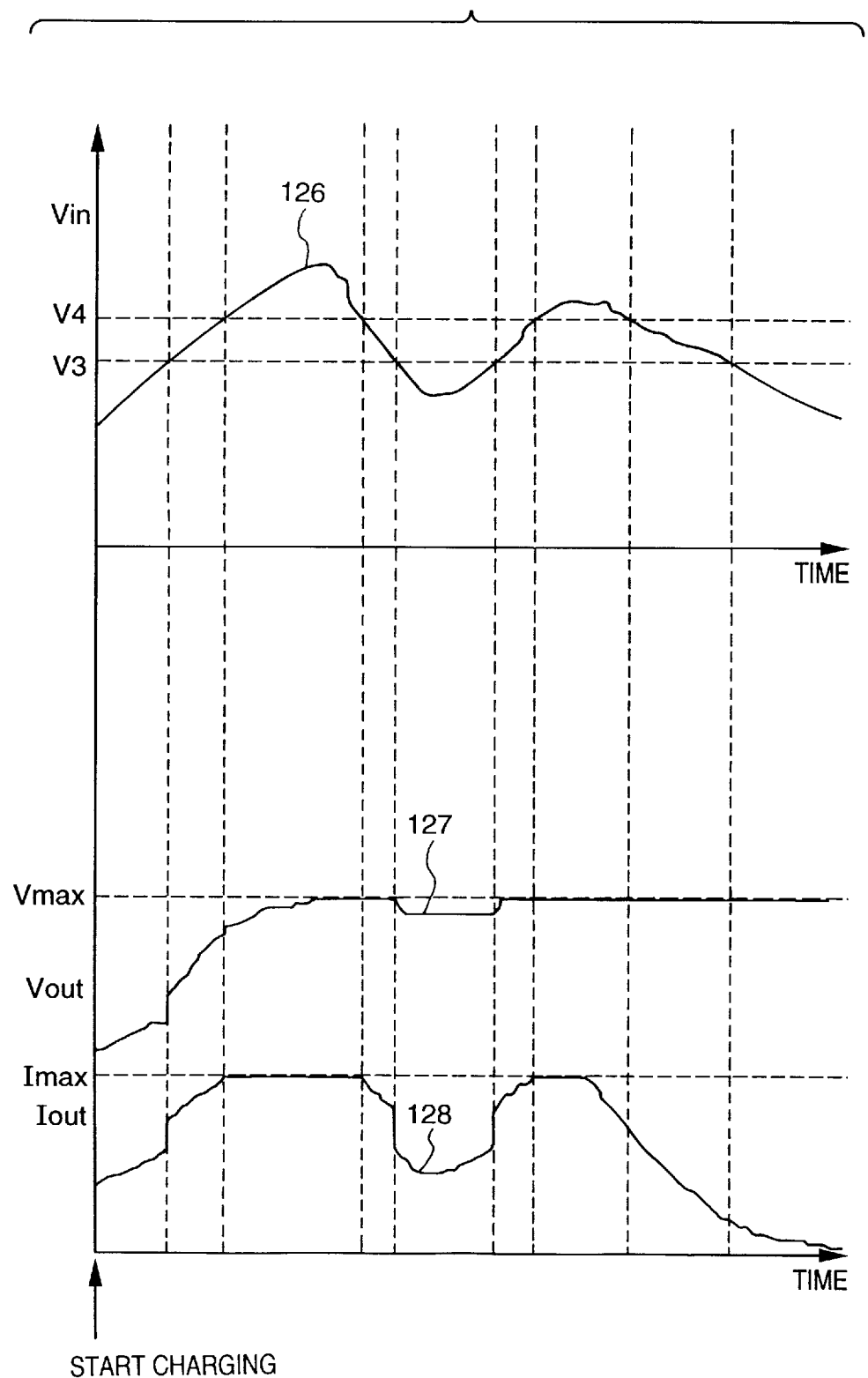
FIG. 9 shows graphs showing an example of an input voltage which affects a charged state.

FIG. 6 is a block diagram illustrating a configuration of a charging system according to a third embodiment and a fourth (will be explained later) embodiment. FIG. 7 is a flowchart of an operation of the charging system according to the third embodiment. Further, FIG. 8 shows a graph showing an example of an input voltage which does not affect the charging operation and a graph showing changes in the charging voltage and the charging current with respect to the change in the input voltage. FIG. 9 shows a graph showing an example of an input voltage which affects charging operation and a graph showing change in the charging voltage and the charging current with respect to the change in the input voltage. In FIG. 6, the units and elements which were previously those explained in the first and second embodiments are referred to by the same reference numerals, and further explanation of these is omitted.

In FIG. 6, reference numeral 21 denotes a switching device for switching charging operations in accordance with a signal from the voltage comparator 3; 23, a switching device for supplying a small charging current Iout to the secondary cell 8 when the input voltage Vin is lower than the reference voltage V3; 22, a resistor for limiting the charging current Iout; and 24 and 25, cell identifiers for identifying the capacity and/or type of the secondary cell 8. These cell identifiers 24 and 25 identify the capacity and/or type of the secondary cell 8 using, e.g., mechanical, optical, electronic, or magnetic method, and input the identified results to the charge controller 4.

When the solar cells 1 are attached to the charging apparatus 2, electric power starts being supplied to the charging apparatus 2. The voltage and current of the electric power supplied to the charging apparatus 2 with the secondary cell 8 being connected to the charging apparatus 2 are controlled by the regulator 6, and the secondary cell 8 is charged via the switching device 5, or the resistor 22 and the switching device 23. The input voltage Vin to the charging apparatus 2 is compared to the reference voltages V3 and V4 (V3<V4) by the voltage comparator 3. The voltage comparator 3 switches the on/off state of the switching device 21 depending upon the comparison result. A signal representing the comparison result by the voltage comparator 3 (called "comparison result signal" hereinafter) is inputted to the charging of controller 4 via the switching device 21. The charge controller 4 turns on or off the switching device 5 depending upon the input comparison result signal. Further, the comparison result signal turns on or off the switching device 23 via the switching device 21. Note, depending upon the destination of the comparison result signal determined by the switching device 21 (either the charging controller 4 or the switching device 23), either the switching device 5 or the switching device 23 is turned on.

A one-chip microcomputer included in the charge controller 4 detects the voltage range of input voltage Vin on the basis of the comparison result signal. Further, the one-chip microcomputer detects the charging voltage Vout and the charging current Iout, supplied to the secondary cell 8, by using a built-in A/D converter.

Next, the relationship between the input voltage Vin, and the charging voltage Vout and the charging current Iout is explained with reference to FIGS. 8 and 9.

In FIG. 8, a voltage curve 123 shows an example of the input voltage Vin which does not affect a charged state. The charging voltage Vout corresponding to the input voltage Vin increases smoothly with respect to time as shown by a voltage curve 124, and a current curve 125 of the charging current Iout also changes smoothly.

In FIG. 9, a voltage curve 126 shows an example of the input voltage Vin which affects a charged state. With respect to the change in the input voltage Vin, the charging voltage Vout shown by a voltage curve 127 changes in dependence upon a change in the charging current Iout shown by a current curve 128.

When the input voltage Vin is lower than the reference voltage V3 (Vin<V3), the regulator 6 is in a state in which it can not stabilize the output voltage. When the input voltage Vin is equal or higher than the reference voltage V3 and equal or lower than the reference voltage V4 (V3≦Vin≦V4), the regulator 6 stabilizes the output voltage at a predetermined value Vmax. When Vin≦V4, the comparison result signal is provided to the switching device 23 via the switching device 21, and the switching device 23 is in the on state. Accordingly, the charging current Iout which is limited to a small current value by the resistor 22 is provided to the secondary cell 8.

Whereas, when the input voltage Vin is higher than the reference voltage V4 (Vin>V4), the regulator 6 can control both the output voltage and the output current. Further, the comparison result signal is provided to the charge controller 4 via the switching device 21, and thus the switching device 5 is in the on state. Therefore, the secondary cell 8 is charged by the charging current Iout limited to a predetermined value Imax by the regulator 6 or by the charging voltage Vout stabilized to Vmax by the regulator 6.

The charge controller 4 detects the charging current Iout, and integrates the charging current Iout for a predetermined period, thereby calculating an accumulated amount of the charging current Iout, namely, the charged amount. Then, when the calculated charged amount reaches the capacity of the secondary cell 8, the charge controller 4 decides to end charging and turns off the switching device 5, thereby completing the charging operation.

Further, the charge controller 4 determines a chargeable capacity of the secondary cell 8 depending upon the charged state of the secondary cell 8 at the time of starting the charging operation (called "initial charged state" hereinafter). As for the method for determining the initial charged state, the relationship between the input voltage Vin, the terminal voltage across the secondary cell 8, and the charging current Iout at the time of starting the charging operation is judged, then the initial charged state of the secondary cell 8 is determined. This determination is performed when the input voltage Vin is sufficiently large (Vin>V3) compared to the charging voltage Vout.

Examples of the secondary cell 8, are a lithium ion battery and a lead battery. The charging method explained in the third embodiment is a so-called constant-voltage/current limit method typically used for charging a lithium ion battery. In the charging operation as shown in FIG. 8, when charging starts, constant-current charge charging by current limit method is performed, and the charging voltage Vout gradually increases. When the charging voltage Vout reaches the voltage value Vmax, a constant-voltage charging starts. As the charging continues further, the charging current Iout decreases smoothly depending upon the charged state of the secondary cell 8.

By using the aforesaid characteristics, the charge controller 4 determines the initial charged state of the secondary cell 8 on the basis of the charging voltage Vout when the charging voltage Vout has not reached Vmax, and when the charging voltage Vout has reached Vmax, then the initial charged state of the secondary cell 8 is determined on the basis of the charging current Iout.

Next, specific processes for detecting the charging current Iout and accumulating the charged amount performed by the charge controller 4 will be explained.

When the secondary cell 8 is connected and the charging current Iout starts flowing, a potential difference arises across the resistor 7 in proportion to the charging current Iout, and this potential difference is inputted to the charge controller 4. As shown in FIG. 9, while performing the constant-voltage charging, if the condition of insolation becomes worse and the input electric power decreases, the charging current Iout also decreases. With no change in the charging current Iout, after the charging voltage Vout reaches Vmax, by determining duration using the timer and finishing charging in accordance with the timer, the secondary cell 8 can be fully charged. However, since the charging current Iout changes in most cases, it is necessary to obtain the charged amount by integrating the charging current Iout for a predetermined period, to determine the full-charged state of the secondary cell 8 on the basis of the integrated charged amount, and then end charging. Below, a common method for obtaining the charged amount is explained with reference to FIG. 8. Referring to FIG. 8, a time to start charging is denoted by T1, and a time to end charging is denoted by T2. If the charging current Iout has a curve f(t) with respect to time t, then the integrated value (charged amount) S of the charging current Iout is expressed by the following equation:

$$S = \int_{T1}^{T2} f(t)dt \tag{2}$$

If the chargeable capacity determined in accordance with the detection of the initial charged state of the secondary cell 8 is denoted by Sa, then, at time T2 when Sa=S is satisfied, charging is finished.

Next, charge control performed by the charging controller 4 is explained. Note, the program realizing the charge control shown in FIG. 7 is stored in a built-in ROM in a one-chip microcomputer included in the charge controller 4 in advance.

When the secondary cell 8 is connected in step S15, charging operation starts in step S16, and the initial charged state of the secondary cell 8 is determined in step S17. Depending upon the determined initial charged state, the chargeable capacity Sa is determined in step S18.

In step S19, the charging current Iout is detected. On the basis of the detected charging current Iout, charged amount S is obtained by accumulation in step S20.

Then, the chargeable capacity Sa is compared to the charged amount S in step S21. Charging operation is continued until the charged amount S becomes equal to the chargeable capacity Sa, and when Sa=S, the charging is terminated in step S22.

Fourth Embodiment

Next, a fourth embodiment of the present invention will be explained.

When the secondary cell 8 is connected to the charging apparatus 2, identification signals indicating the capacity and type of the secondary cell 8 are sent from the battery identifiers 24 and 25 to the charge controller 4. The charge controller 4 identifies the secondary cell 8 on the basis of the input identification signals, and depending upon the determined capacity of the secondary cell 8, the charge controller 4 changes a reference for determining the chargeable capacity Sa.

Figure 10:
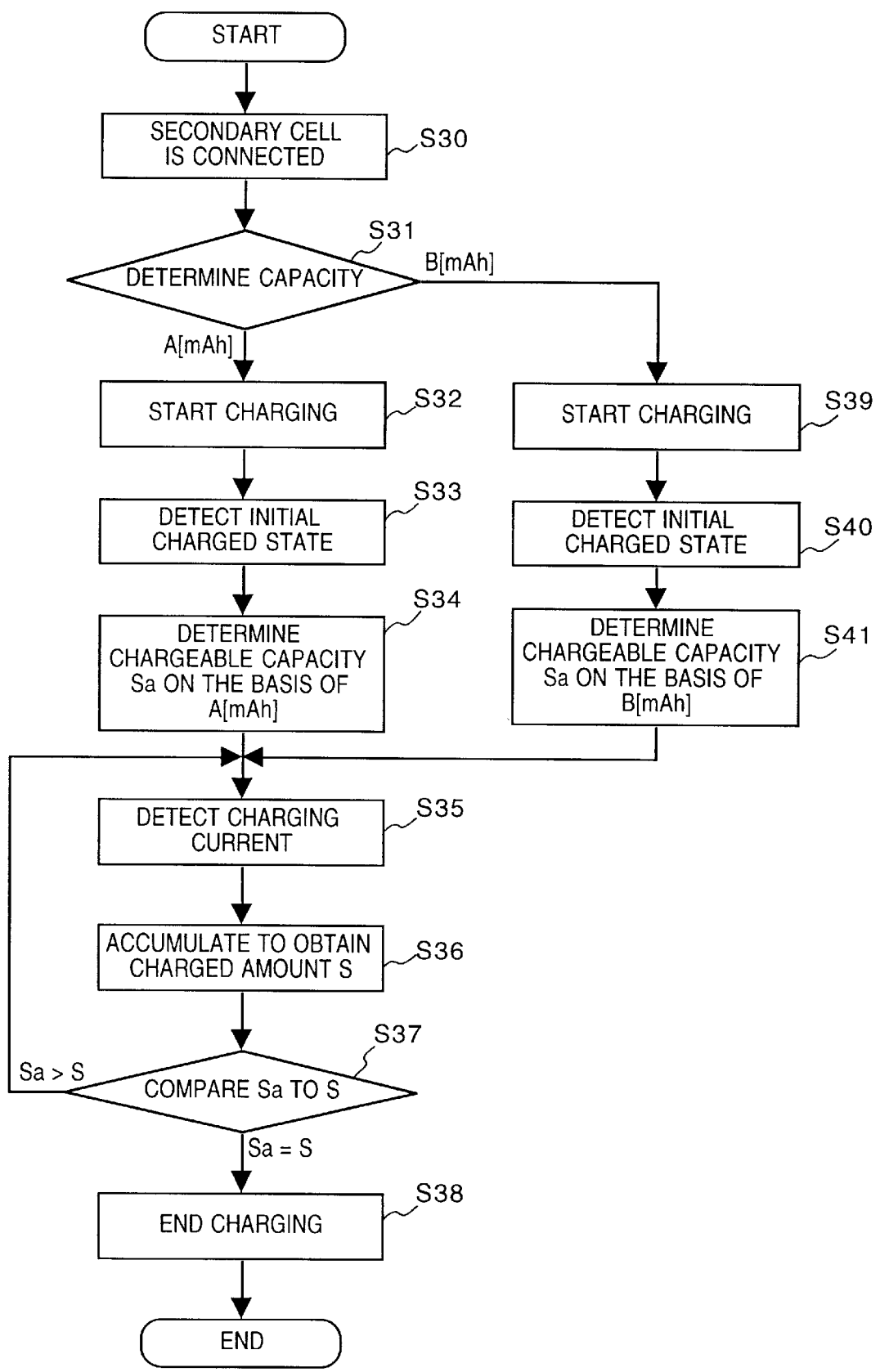
FIG. 10 is a flowchart of an operation of the charging system according to the fourth embodiment.

FIG. 10 is a flowchart of an operation of the charging system according to the fourth embodiment. The charge control performed by the charge controller 4 depending upon the type and/or capacity of the secondary cell 8 is explained with reference to FIG. 10. Here, two cases, where the capacities of the secondary cell 8 are A[mAh], and B[mAh] are explained. Note, the program realizing the charge control shown in FIG. 10 is stored in the built-in ROM in the one-chip microcomputer included in the charge controller 4 in advance.

When the secondary cell 8 is connected in step S30, the capacity of the secondary cell 8 is determined on the basis of the shape of the secondary cell 8 or a signal from the battery identifier 25, configured as an electronic circuit, for example, which is included in the secondary cell 8, and the reference for determining the chargeable capacity Sa is changed in accordance with the detected capacity. For example, when the secondary cell 8 having the capacity of A[mAh] is connected, then the process proceeds to step S32. After the charging operation starts in step S32, the initial charged state of the secondary cell 8 is detected in step S33. In step S34, the chargeable capacity Sa is determined based on the A[mAh] and the initial charged state. Then, the process proceeds to step S35, and the charging current Iout is detected. The charged amount S is obtained by accumulating the detected charging current Iout in step S36, and the chargeable capacity Sa and the charged amount S are compared in step S37. Charging operation is continued until the charged amount S becomes equal to the chargeable capacity Sa, and when Sa=S, the charging operation is terminated in step S38.

Whereas, when the secondary cell having the capacity of B[mAh] is connected in step S30, then the process proceeds from step S31 to step S39. After the charging operation starts in step S39, the initial charged state of the secondary cell 8 is detected in step S40. In step S41, the chargeable capacity Sa is determined based on the B[mAh] and the detected initial charged state. Thereafter, the process proceeds to step S35 and the same charge control as that performed when the secondary cell 8 of A[mAh] is connected is performed.

Fifth Embodiment

A fifth embodiment will now be explained below. In the fifth embodiment, the secondary cell 8 is fixed to the charging apparatus 2.

Figure 11:
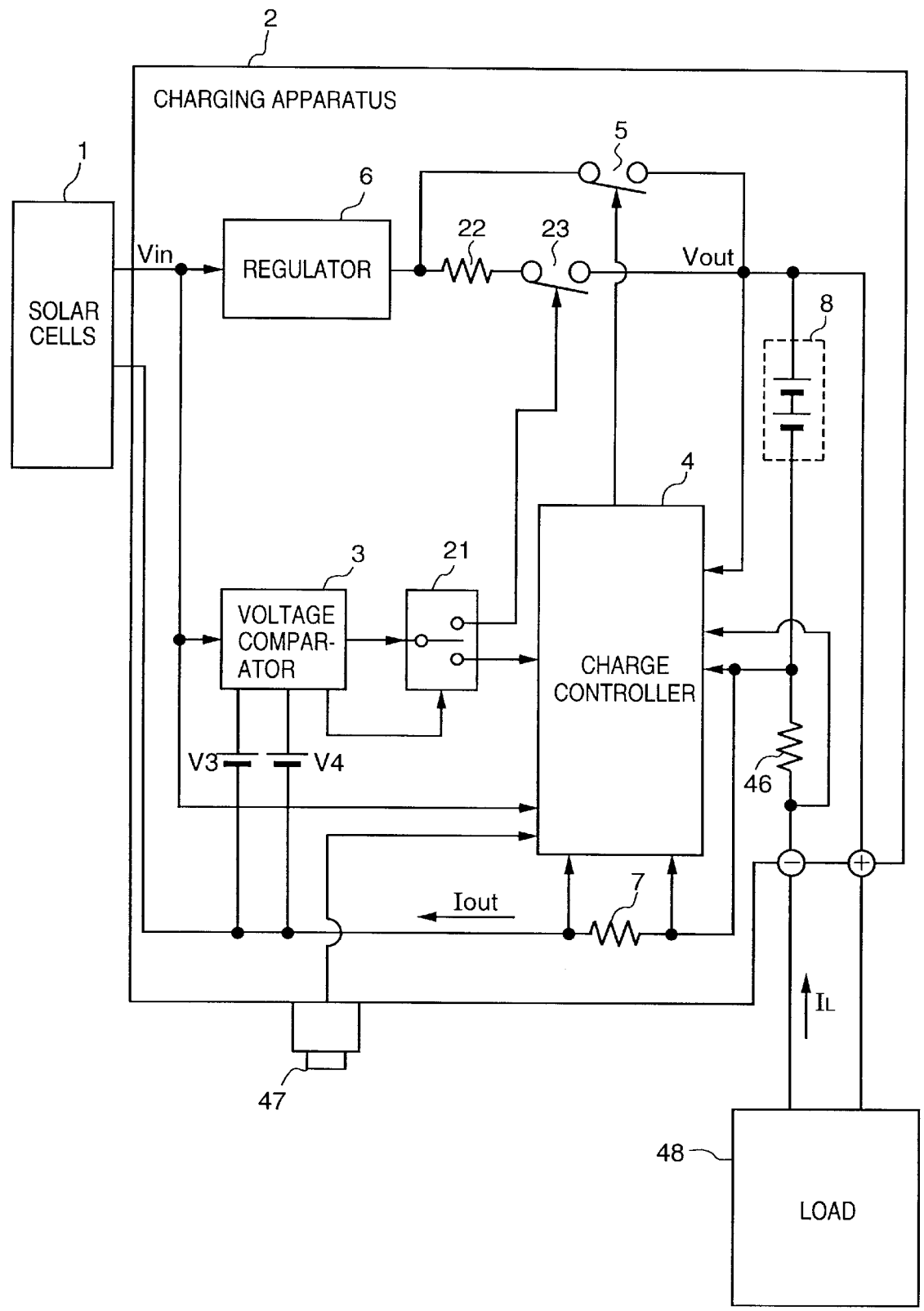
FIG. 11 is a block diagram illustrating a configuration of a charging system according to a fifth embodiment of the present invention.
Figure 12:
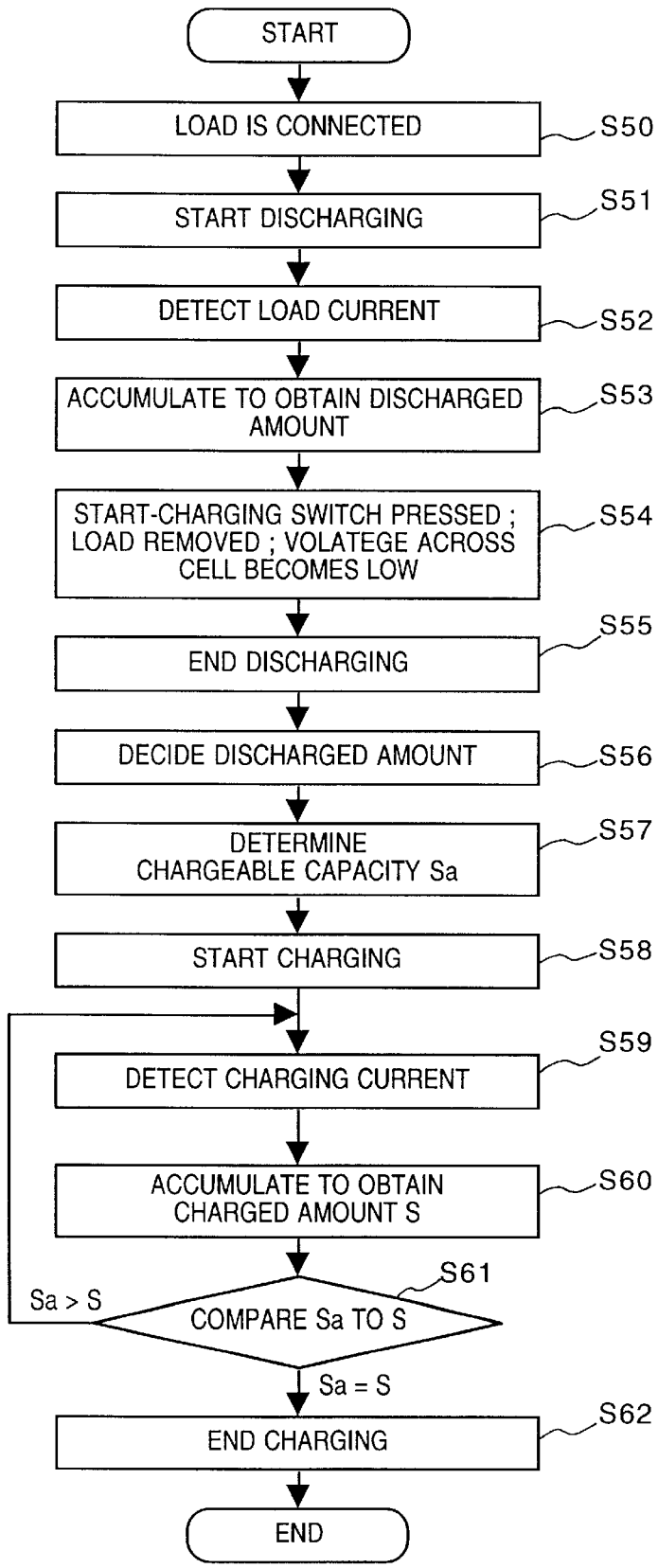
FIG. 12 is a flowchart of an operation of the charging system shown in FIG. 11.

FIG. 11 is a block diagram illustrating a configuration of a charging system according to the fifth embodiment, and FIG. 12 is a flowchart of an operation of the charging system shown in FIG. 11.

In FIG. 11, reference numeral 46 denotes a resistor for detecting load current $I_L$; 47, a switch used for initiating charging operation; and 48, a load. Note, in FIG. 11, the units and elements which were previously explained in the first and third embodiments are referred to by the same reference numerals, and further explanation of these is omitted.

When the load 48 is connected to the charging apparatus 2, the load current $I_L$ starts flowing and a potential difference arises across the resistor 46 in proportion to the load current $I_L$. The potential difference is inputted to the charge controller 4, and the load current $I_L$ is detected. The charge controller 4 obtains a discharged amount from the secondary cell 8 by integrating the detected load current $I_L$ for a predetermined period. When the start-charging switch 47 is pressed, or the load 48 is disconnected, or the voltage across the secondary cell 8 becomes low caused by discharge, the chargeable capacity Sa is determined on the basis of the obtained discharged amount, and used for determining when to end the charging operation.

Next, charge control performed by the charging controller 4 on the basis of the discharged amount is explained with reference to FIG. 12. Note, the program realizing the charge control shown in FIG. 12 is stored in a built-in ROM in a one-chip microcomputer included in the charge controller 4 in advance.

First, when the load 48 is connected in step S50, the secondary cell 8 starts discharging in step S51. Next in step S52, on the basis of a potential difference across the resistor S52, the load current $I_L$ is determined. In step S53, the discharged amount is obtained by accumulating the determined load current $I_L$. When the start-charging switch 47 is pressed, or the load 48 is disconnected, or the voltage across the secondary cell 8 becomes low, the discharge is terminated and the discharged amount is calculated. On the basis of the data on the calculated discharged amount, the chargeable capacity Sa is determined in step S57, then charging operation to charge the secondary cell 8 starts in step S58. In the subsequent steps S19 to S22, the same processes as those explained in the third embodiment are performed.

Sixth Embodiment

Next, a sixth embodiment is explained. In the sixth embodiment, a battery package including the secondary cell 8 to be charged has a built-in one-chip microcomputer for determining a discharged amount.

Figure 13:
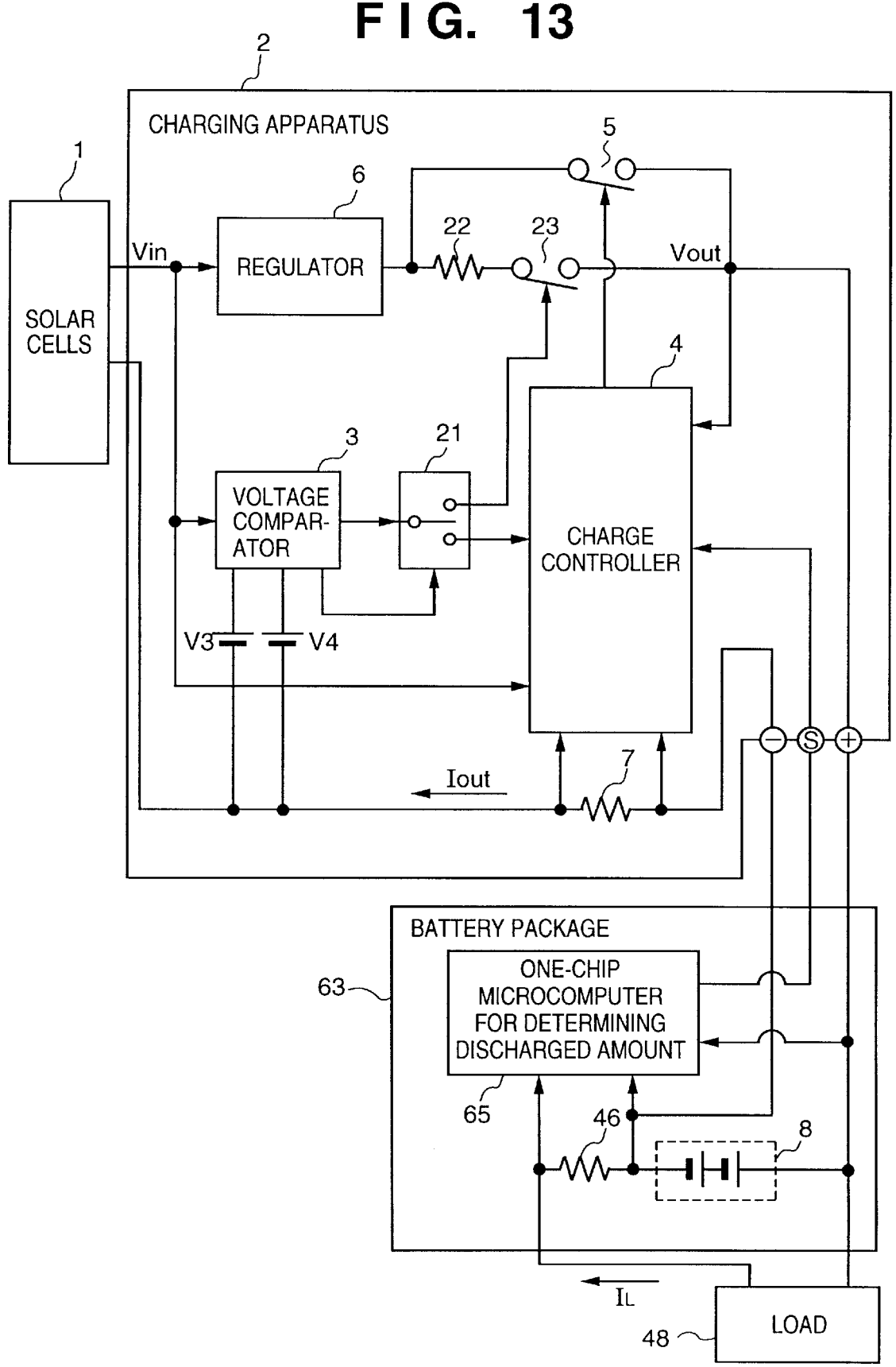
FIG. 13 is a block diagram illustrating a configuration of a charging system according to a sixth embodiment of the present invention.
Figure 14:
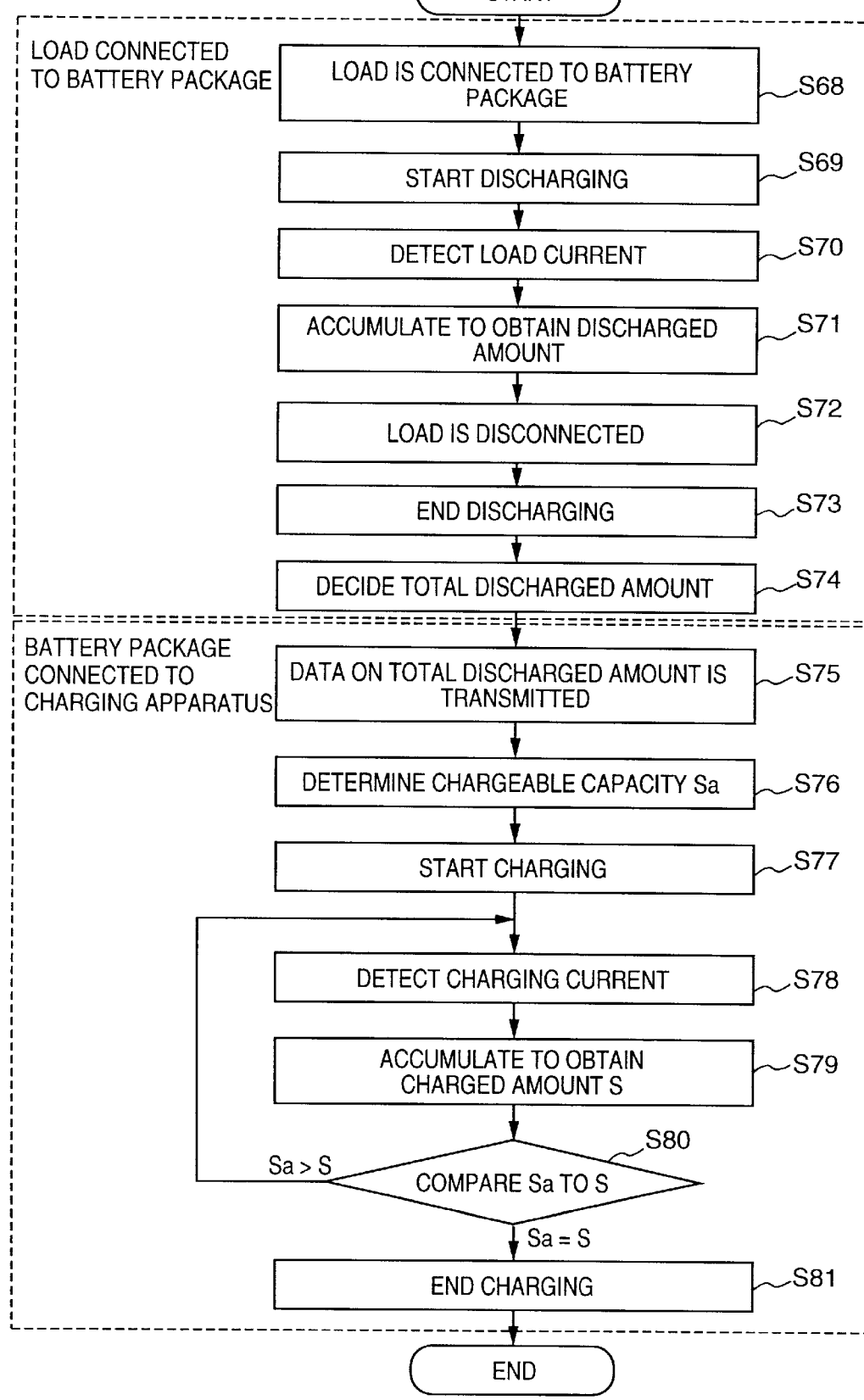
FIG. 14 is a flowchart of an operation of the charging system shown in FIG. 13.

FIG. 13 is a block diagram illustrating a configuration of a charging system according to the sixth embodiment of the present invention and FIG. 14 is a flowchart of an operation of the charging system shown in FIG. 13.

In FIG. 13, reference numeral 63 denotes a battery package; 46, a resistor used for detecting a load current $I_L$; and 65, a one-chip microcomputer for determining the discharged amount. Note, in FIG. 13, the units and elements which were previously explained in the first, third and fifth embodiments are referred to by the same reference numerals, and further explanation of these is omitted.

When the load 48 is connected to the battery package 63, the load current $I_L$ starts flowing through the resistor 46. At this time, a potential difference arises across the resistor 46 in proportion to the load current $I_L$. The one-chip microcomputer 65 for determining the discharged amount calculates the discharged amount from the secondary cell 8 on the basis of the voltage across the resistor 46 and time, and the total discharged amount from the secondary cell 8 is decided when the load 48 is disconnected. Thereafter, when the battery package 63 is connected to the charging apparatus 2, data on the total discharged amount from the secondary cell 8 is sent from the one-chip microcomputer 65 to the charge controller 4, and the chargeable capacity Sa is determined by the charge controller 4 on the basis of the data. The subsequent control is the same as that explained in the third embodiment.

Next, the detection processes of the total discharged amount performed by the one-chip microcomputer 65 and charge control performed by the charging controller 4 on the basis of the total discharged amount are explained. Note, the program realizing the detection processes of the total discharged amount is stored in a built-in ROM in the one-chip microcomputer 65, and the program realizing the charge control is stored in a built-in ROM in a one-chip microcomputer included in the charge controller 4 in advance.

First, when the load 48 is connected to the battery package 63 in step S68, the load current $I_L$ starts flowing through the resistor 46 in step S69. Thereafter, the one-chip microcomputer 65 determines the load current $I_L$ in step S70, and in step S71, the discharged amount is obtained by accumulating the detected load current $I_L$.

When the load 48 is disconnected in step S72, the discharge is terminated in step S73 and the one-chip microcomputer 65 decides the total discharged amount in step S74.

When the battery package 63 is connected to the charging apparatus 2, the data on the total discharged amount is transmitted from the one-chip microcomputer 65 to the charge controller 4 in step S75. The charge controller 4 determines the chargeable capacity Sa on the basis of the received data on the decided discharged amount in step S76, and then charging operation to charge the secondary cell 8 starts in step S77. In the subsequent steps S19 to S22, the same processes as those explained in the third embodiment are performed.

Seventh Embodiment

A seventh embodiment is now explained. In the seventh embodiment, an apparatus (a load) having the secondary cell 8 and the one-chip microcomputer 65 for determining a discharged amount from the secondary cell 8 is connected to the charging apparatus 2.

Figure 15:
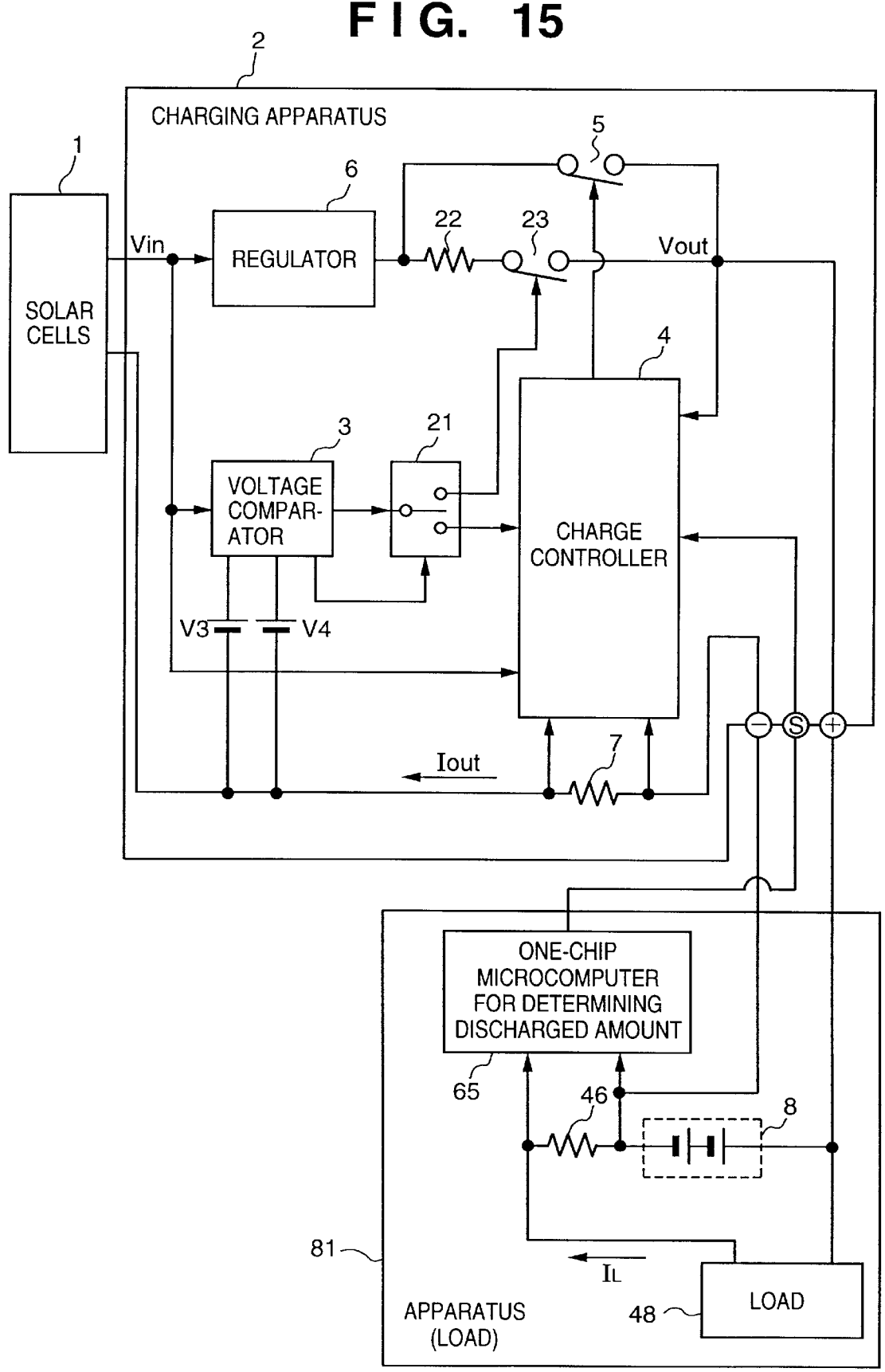
FIG. 15 is a block diagram illustrating a configuration of a charging system according to a seventh embodiment of the present invention.
Figure 16:
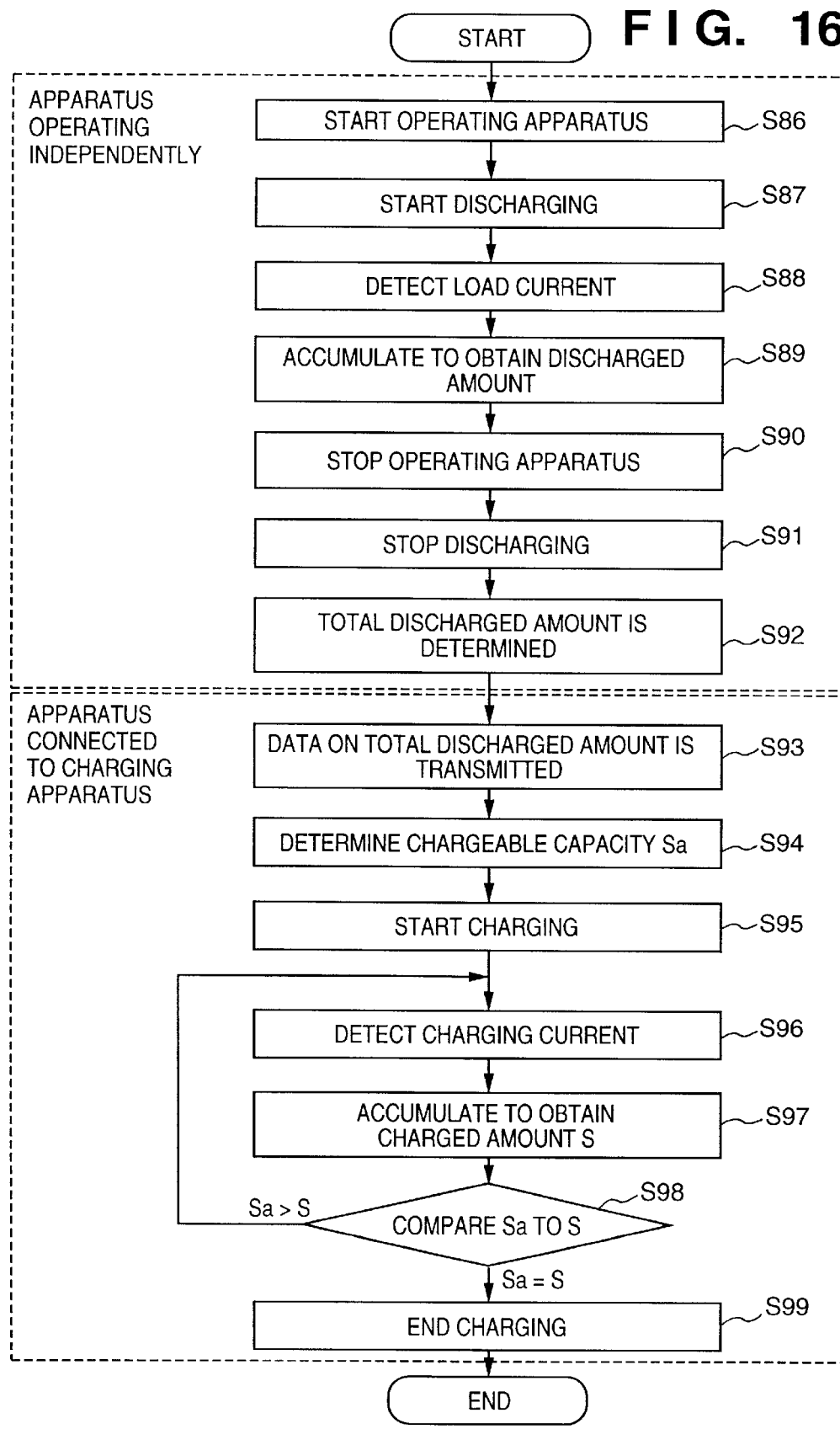
FIG. 16 is a flowchart of an operation of the charging system shown in FIG. 15.

FIG. 15 is a block diagram illustrating a configuration of a charging system according to the seventh embodiment of the present invention, and FIG. 16 is a flowchart of an operation of the charging system shown in FIG. 15. Note, in FIG. 15, the units and elements which were previously explained in the first, third, fifth and sixth embodiments are referred to by the same reference numerals, and further explanation of these is omitted.

In FIG. 15, reference numeral 81 denotes an apparatus (a load) having the secondary cell 8 and the one-chip microcomputer 65 for determining a discharged amount from the secondary cell 8.

When the apparatus 81 starts operating, the load current $I_L$ starts flowing through the resistor 46. At this time, a potential difference arises across the resistor 46 in proportion to the load current $I_L$. The one-chip microcomputer 65 for determining the discharged amount obtains discharged amount from the secondary cell 8 on the basis of the voltage across the resistor 46 and time.

When the apparatus 81 stops operating, the one-chip microcomputer 65 determines the total discharged amount from the secondary cell 8. Thereafter, when the apparatus 81 is connected to the charging apparatus 2, data on the total discharged amount is transmitted from the one-chip microcomputer 65 to the charge controller 4, and the chargeable capacity Sa is determined by the charge controller 4 on the basis of the data. The subsequent control is the same as that explained in the third embodiment.

Next, detection processes of the total discharged amount performed by the one-chip microcomputer 65 and charge control performed by the charge controller 4 are explained.

First, when the apparatus 81 starts operating in step S86, the load current $I_L$ starts flowing through the resistor 46 in step S87. Thereafter, the one-chip microcomputer 65 determines the load current $I_L$ in step S88, and in step S89, the discharged amount is obtained by accumulating the determined load current $I_L$. When the apparatus 81 stops operating in step S90, the discharge is ended in step S91 and the one-chip microcomputer 65 determines the total discharged amount from the secondary cell 8 in step S92.

When the apparatus 81 is connected to the charging apparatus 2, the data on the total discharged amount is transmitted from the one-chip microcomputer 65 to the charge controller 4 in step S93. The charge controller 4 determines the chargeable capacity Sa on the basis of the received data of the total discharged amount in step S94, and then charging operation starts in step S95. In the subsequent steps S19 to S22, the same processes as those explained in the third embodiment are performed.

Eighth Embodiment

Next, an eighth embodiment is explained. In the eighth embodiment, a battery package 63 includes the secondary cell 8 and the charge controller 4.

Figure 17:
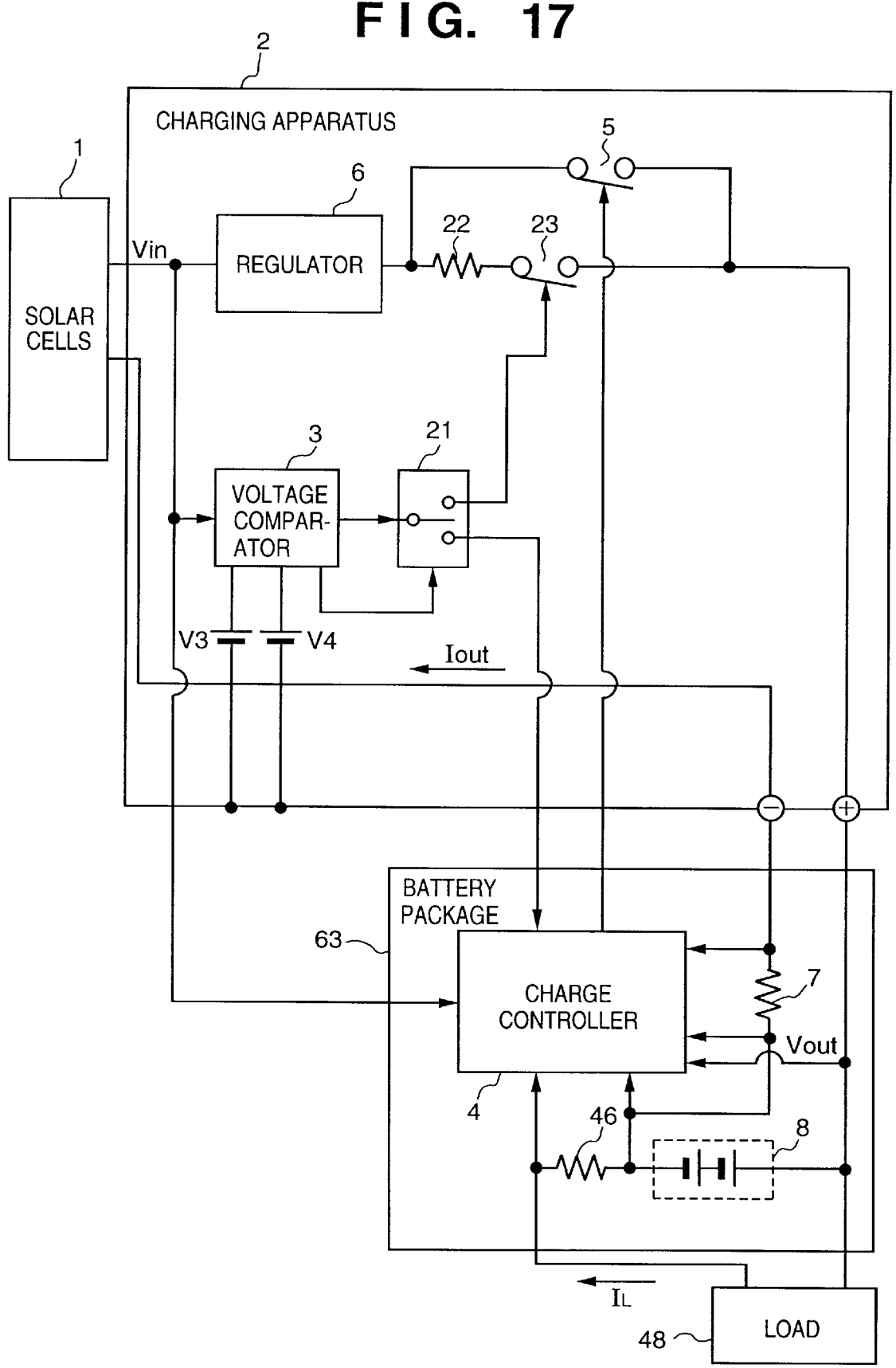
FIG. 17 is a block diagram illustrating a configuration of a charging system according to an eighth embodiment of the present invention.
Figure 18:
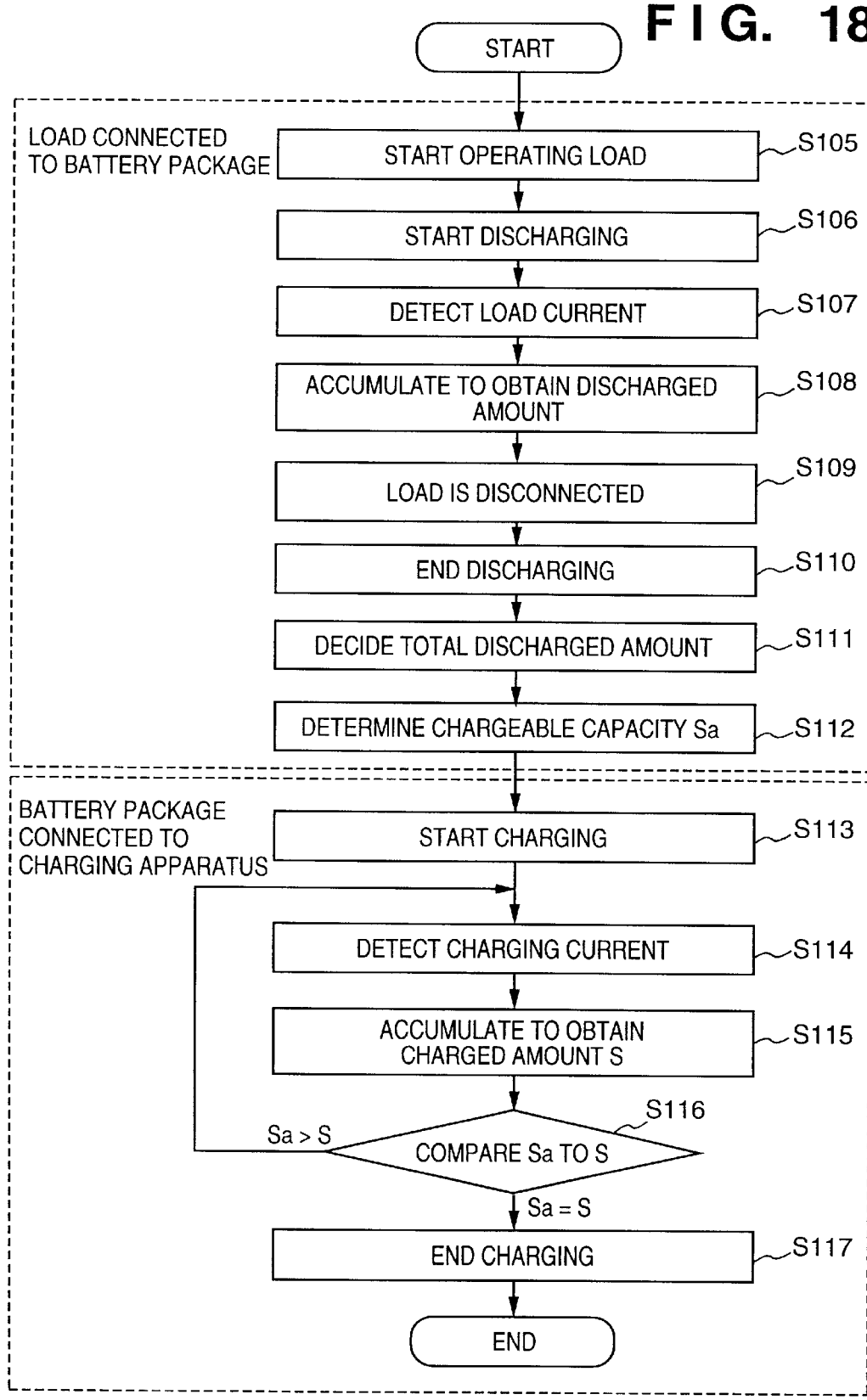
FIG. 18 is a flowchart of an operation of the charging system shown in FIG. 17.

FIG. 17 is a block diagram illustrating a configuration of a charging system according to the eighth embodiment of the present invention and FIG. 18 is a flowchart of an operation of the charging system shown in FIG. 17. Note, in FIG. 17, the units and elements which were previously explained in the first, third, fifth, sixth and seventh embodiments are referred to by the same reference numerals, and further explanation of these is omitted.

When the load 48 is connected to the battery package 63, the load current $I_L$ starts flowing through the resistor 46. At this time, a potential difference arises across the resistor 46 in proportion to the load current $I_L$. The charge controller 4 obtains discharged amount from the secondary cell 8 on the basis of the voltage across the resistor 46 and time.

The total discharged amount from the secondary cell 8 is decided when the load 48 is disconnected or when the charge controller 4 receives a start-charging signal, in cases when the voltage of the secondary cell 8 becomes low and when a start-charging switch (not shown) is turned on. Thereafter, when the battery package 63 is connected to the charging apparatus 2, the charge controller 4 controls the charging apparatus 2 to start charging. The subsequent control is the same as that explained in the third embodiment.

Next, the charge control performed by the charge controller 4 on the basis of the total discharged amount is explained with reference to FIG. 18.

First, the load 48 is connected to the battery package 63 and the load 48 starts operating in step S105, the load current $I_L$ starts flowing from the secondary cell 8 through the resistor 46 in step S106. Thereafter, the charge controller 4 determines the load current $I_L$ in step S107, and in step S108, the discharged amount is obtained by accumulating the detected load current $I_L$. When the load 48 is disconnected or the start-charging signal is received in step S108, the discharge is ended in step S110 and the charge controller 4 determines the total discharged amount in step S111 and the chargeable capacity Sa in step S112.

When the battery package 63 is connected to the charging apparatus 2, charging operation to charge the secondary cell 8 starts under control of the charge controller 4 of the battery package 63 in step S113. In the subsequent steps S19 to S22, the same processes as those explained in the third embodiment are performed.

Ninth Embodiment

Next, a ninth embodiment is explained. In the ninth embodiment, an apparatus (a load) having the secondary cell 8 and the charge controller 4 is connected to the charging apparatus 2.

Figure 19:
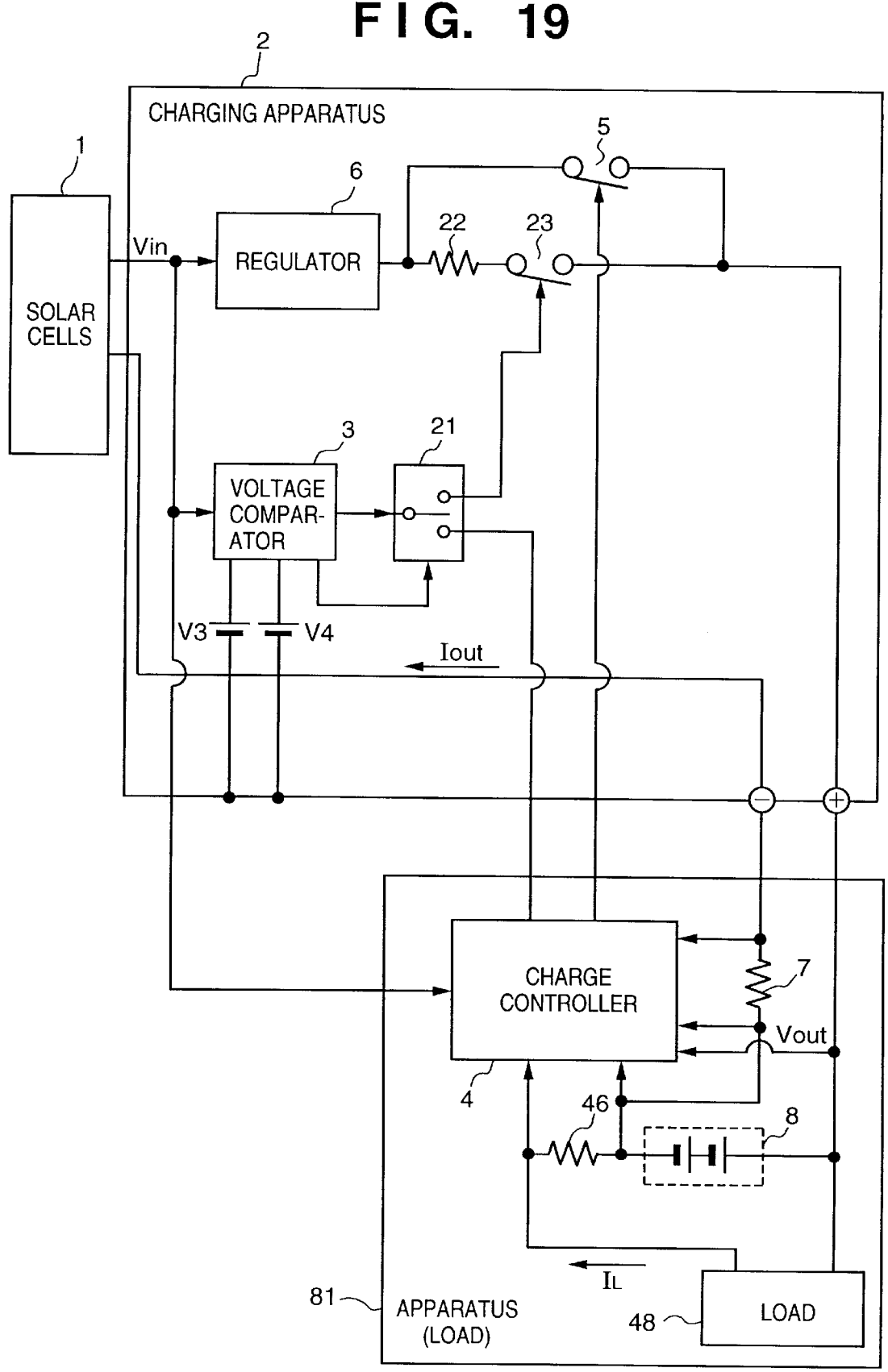
FIG. 19 is a block diagram illustrating a configuration of a charging system according to a ninth embodiment of the present invention.
Figure 20:
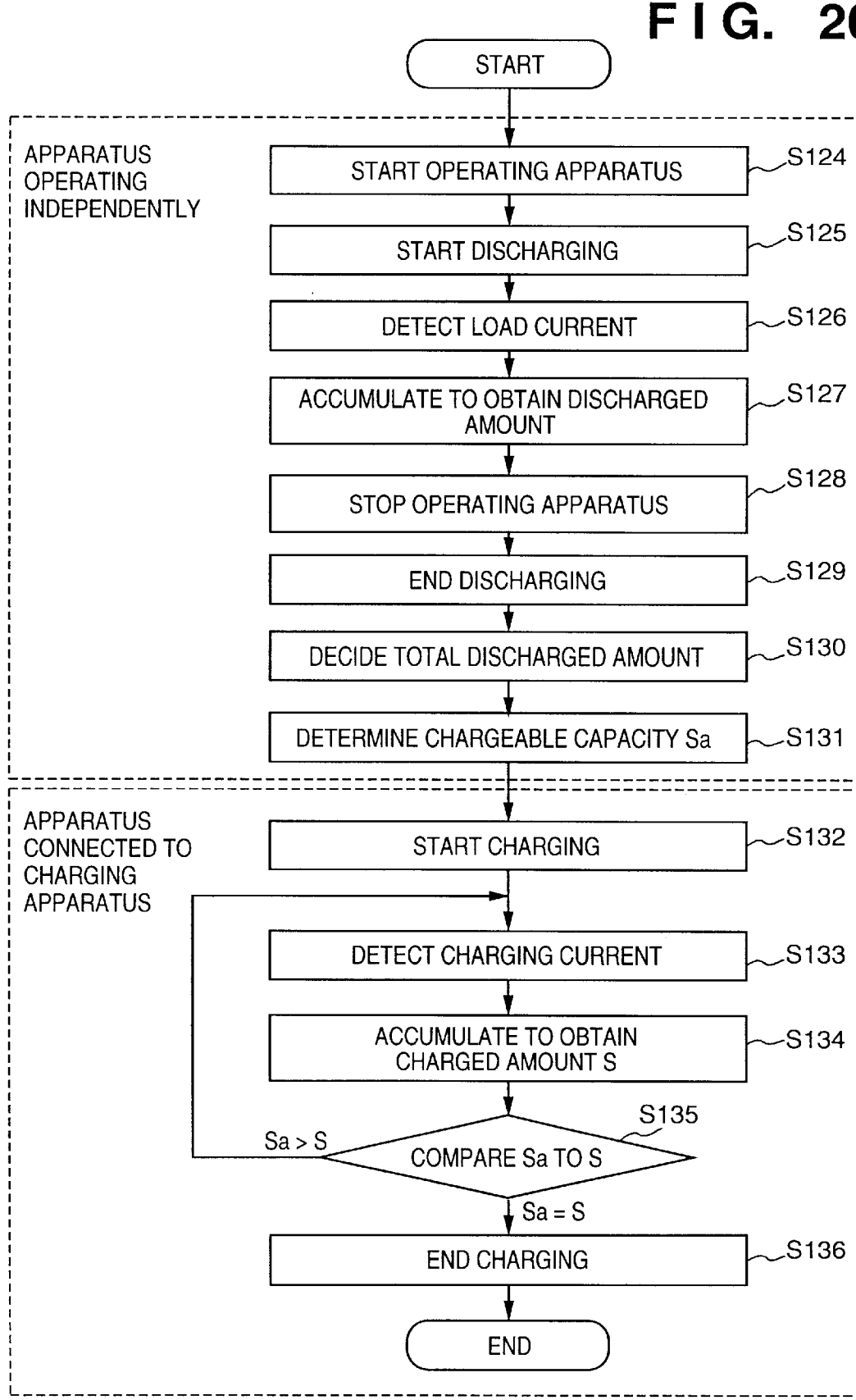
FIG. 20 is a flowchart of an operation of the charging system shown in FIG. 19.

FIG. 19 is a block diagram illustrating a configuration of a charging system according to the ninth embodiment and FIG. 20 is a flowchart of an operation of the charging system shown in FIG. 19. Note, in FIG. 19, the units and elements which were previously explained in the first, third, fifth, sixth and seventh embodiments are referred to by the same reference numerals, and further explanation of these is omitted.

When the apparatus 81 starts operated, the load current $I_L$ starts flowing through the resistor 46. At this time, a potential difference arises across the resistor 46 in proportion to the load current $I_L$. The charge controller 4 obtains discharged amount from the secondary cell 8 on the basis of the voltage across the resistor 46 and time. When the apparatus 81 stops operating, the charge controller 4 determines the total discharged amount from the secondary cell 8. Thereafter, when the apparatus 81 is connected to the charging apparatus 2, the charge controller 4 controls the charging apparatus 2 to start the charging operation. The subsequent control is the same as that explained in the third embodiment.

Next, charge control performed by the charge controller 4 on the basis of the total discharged amount is explained with reference to FIG. 20.

First, when the apparatus 81 starts operating in step S124, the load current $I_L$ starts flowing through the resistor 46 in step S125. Thereafter, the charge controller 4 determines the load current $I_L$ in step S126, and then in step S127, the discharged amount is obtained by accumulating the detected load current $I_L$. When the apparatus 81 stops operating in step S128, the discharge is ended in step S129 and the charge controller 4 determines the total discharged amount in step S130. Further, the chargeable capacity is determined in step S131.

When the apparatus 81 is connected to the charging apparatus 2, charging operation starts under control of the charge controller 4 in step S132. In the subsequent steps S19 to S22, the same processes as those explained in the third embodiment are performed.

According to the third to ninth embodiments as described above, it is possible to perform a stable charging operation to charge a secondary cell even when an electric power supply, such as solar cells, whose output is unstable, is used for charging.

The present invention is not limited to the above embodiments and various changes and modifications can be made within the spirit and scope of the present invention. Therefore to apprise the public of the scope of the present invention, the following claims are made.

What is claimed is:

1. A charging apparatus for charging a secondary cell by electric power supplied from an unstable electric power supply, said apparatus comprising:

comparison means for comparing a voltage Vin supplied from the unstable electric power supply to a first predetermined voltage V1;

a regulator for supplying electric power to the secondary cell after controlling voltage or current of the electric power supplied from the unstable electric power supply; and control means for controlling operation of said regulator on the basis of voltage and current to be supplied to the secondary cell, wherein said regulator has a first charge mode for providing a small current to the secondary cell and a second charge mode for providing a large current to the secondary cell, and wherein, if a comparison result by said comparison means is Vin≦V1, said regulator operates in the first charge mode, thereafter, said control means controls said regulator to operate in the second charge mode for a short period of time at a predetermined time interval, and, if a comparison result by said comparison means at that short period is Vin>V1, then said control means controls said regulator to switch to operate in the second mode.

2. The apparatus according to claim 1, wherein said control means detects a full-charged state of the secondary cell on the basis of the voltage and current to be supplied to the secondary cell.

3. The apparatus according to claim 1 further comprising:

a first switch, connected between said regulator and the secondary cell in series, whose on/off is controlled by said control means; and a second switch, connected between the unstable electric power supply and the secondary cell so as to by-pass said regulator and said first switch, whose on/off is controlled by said comparison means, wherein said comparison means compares the voltage Vin to a second predetermined voltage V2, the second predetermined voltage having a value less than the first predetermined voltage V1, and, if a comparison result by said first switch is closed and said second switch is opened, and, if a comparison result is Vin≦V2, then said first switch is opened and said second witch is closed.

4. The apparatus according to claim 3, wherein a resistor for limiting an amount of current to be supplied to the secondary cell is connected to said second switch in series.

5. The apparatus according to claim 1, wherein the unstable electric power supply is a solar cell.

6. The apparatus according to claim 1, wherein the secondary cell is a lithium ion cell.

7. A charging method having comparison means for comparing a voltage Vin supplied from an unstable electric power supply to a predetermined voltage V1 and a regulator for supplying electric power to a secondary cell after controlling voltage or current of the electric power supplied from the unstable electric power supply, wherein the regulator has a first charge mode for providing a small current to the secondary cell and a second charge mode for providing a large current to the secondary cell, said method comprising the steps of:

controlling the regulator, when a comparison result by the comparison means is Vin≦V1 and after the operation of the regulator is changed to the first charge mode, to operate in the second charge mode for a short period of time at a predetermined time interval;

determining a comparison result by the comparison means at that short period; and controlling the regulator to switch to operate in the second mode when a comparison result shows Vin>V1.

8. A charging apparatus for charging a secondary cell by electric power supplied from an unstable electric power supply, said apparatus comprising:

comparison means for comparing a voltage vin supplied from the unstable electric power supply to a predetermined voltage V3;

a regulator for supplying electric power to the secondary cell after controlling voltage or current of the electric power supplied from the unstable electric power supply;

a first switch connected between said regulator and the secondary cell in series;

a second switch, connected to said first switch in parallel, whose on/off is controlled by said comparison means; and control means for controlling on/off of said first switch on the basis of a comparison result by said comparison means and a charged state of the secondary cell, wherein, if a comparison result by said comparison means is Vin≦V3, then said first switch is opened and said second switch is closed, if a comparison result is Vin>V3 and it is determined that the secondary cell is not in full-charged state, then said first switch is closed and said second switch is opened, and if a comparison result is Vin>V3 and it is determined that the secondary cell is in full-charged state, then said first and second switches are opened.

9. The apparatus according to claim 8, wherein a resistor for limiting an amount of current to be supplied to the secondary cell is connected to said second switch in series.

10. The apparatus according to claim 8, wherein said control means obtains a charged amount of the secondary cell by measuring current supplied to the secondary cell, and determines charged state of the secondary cell on the basis of the obtained charged amount.

11. The apparatus according to claim 10, wherein a determination on the charged state by said control means is performed by comparing the charged amount to an chargeable capacity of the secondary cell, and the chargeable capacity is set by said control means on the basis of the voltage Vin supplied from the unstable electric power supply, a terminal voltage across the secondary cell and charging current when starting charging the secondary cell.

12. The apparatus according to claim 10 further comprising detection means for detecting a type of the secondary cell connected to said apparatus, wherein a determination on the charged state by said control means is performed by comparing the charged amount to an chargeable capacity of the secondary cell, and the chargeable capacity is set by said control means on the basis of the voltage Vin supplied from the unstable electric power supply, a terminal voltage across the secondary cell, charging current when starting charging the secondary cell, and the type of the secondary cell detected by said detection means.

13. The apparatus according to claim 10, wherein said control means obtains a discharged amount from the secondary cell by measuring current discharged from said secondary cell, and determines the charged state of the secondary cell on the basis of the obtained discharged amount.

14. The apparatus according to claim 13, wherein a determination of the charged state by said control means is performed by comparing the charged amount to an chargeable capacity of the secondary cell, and the chargeable capacity is set by said control means on the basis of the discharged amount from the secondary cell.

15. The apparatus according to claim 8, wherein the secondary cell comprises detection means for detecting a discharged amount by measuring discharged current, and said control means determines a charged state of the secondary cell on the basis of data on the discharged amount received from said detection means of the secondary cell.

16. The apparatus according to claim 15, wherein a determination of the charged state by said control means is performed by comparing the charged amount to an chargeable capacity of the secondary cell, and the chargeable capacity is set by said control means on the basis of the discharged amount of the secondary cell.

17. The apparatus according to claim 8, wherein an external device including the secondary cell comprises detection means for detecting a discharged amount of the secondary cell by measuring current discharged from the secondary cell, and said control means determines a charged state of the secondary cell on the basis of data on the discharged amount received from said detection means of the external device.

18. The apparatus according to claim 17, wherein a determination of the charged state by said control means is performed by comparing the charged amount to an chargeable capacity of the secondary cell, and the chargeable capacity is set by said control means on the basis of the discharged amount of the secondary cell.

19. The apparatus according to claim 8, wherein said control means and the secondary cell are included in a battery pack, and said control means obtains a discharged amount from the secondary cell by measuring current discharged from the secondary cell, and determines the charged state of the secondary cell on the basis of the obtained discharged amount.

20. The apparatus according to claim 19, wherein a determination of the charged state by said control means is performed by comparing the charged amount to a chargeable capacity of the secondary cell, and the chargeable capacity is set by said control means on the basis of the discharged amount from the secondary cell.

21. The apparatus according to claim 8, wherein the unstable electric power supply is a solar cell.

22. The apparatus according to claim 8, wherein the secondary cell is a lithium ion battery.

23. A charging method for charging a charging apparatus having comparison means for comparing a voltage Vin supplied from an unstable electric power supply to a predetermined voltage V3, a regulator for supplying electric power to a secondary cell after controlling voltage or current of the electric power supplied from the unstable electric power supply, a first switch connected between said regulator and the secondary cell in series, and a second switch, connected to said first switch in parallel, whose on/off is controlled by said comparison means, said method comprising the steps of:

opening the first switch and closing the second switch if a comparison result by said comparison means is $Vin \leq V3$;

closing the first switch and opening the second switch if a comparison result is Vin>V3 and it is determined that the secondary cell is not in full-charged state; and opening first and second switches if a comparison result is Vin>V3 and it is determined that the secondary cell is in full-charged state.

24. A charging apparatus for charging a secondary cell included in an external apparatus by electric power supplied by an unstable electric power supply said charging apparatus comprising:

comparison means for comparing a voltage Vin supplied from the unstable electric power supply to a predetermined voltage V3;

a regulator for supplying electric power to the secondary cell after controlling voltage or current of the electric power supplied from the unstable electric power supply; and a first switch connected between said regulator and the secondary cell in series;

a second switch, connected to said first switch in parallel, whose on/off is controlled by said comparison means, wherein, if a comparison result by said comparison means is $Vin \leq V3$, then said first switch is opened and said second switch is closed, if a comparison result is Vin>V3 and it is determined that the secondary cell is not in full-charged state, then said first switch is closed and said second switch is opened, and if a comparison result is Vin>V3 and it is determined that the secondary cell is in full-charged state, then said first and second switches are opened.

25. The apparatus according to claim 24, wherein a resistor for limiting an amount of current to be supplied to the secondary cell is connected to said second switch in series.

26. The apparatus according to claim 24, wherein the unstable electric power supply is a solar cell.

27. The apparatus according to claim 24, wherein the secondary cell is a lithium ion battery.

* * * * *

UNITED STATES PATENT AND TRADEMARK OFFICE
CERTIFICATE OF CORRECTION

PATENT NO. : 5,869,949
DATED : February 9, 1999
INVENTOR(S) : TSUTOMU NISHIKAWA, ET AL.

Page 1 of 2

It is certified that error appears in the above-identified patent and that said Letters Patent is hereby corrected as shown below:

COLUMN 1

Line 50, "charges" should read --changes--.

COLUMN 3

Line 20, "affected" should read --affect--.

COLUMN 6

Line 50, "(<V1 V2)," should read --(V2<V1),--.

COLUMN 7

Line 39, "operation" should be deleted;
    Line 52, "(will be explained later) embodiment."
should read --embodiment which will be explained later.--; and
    Line 63, "those" should be deleted.

COLUMN 8

Line 25, "charging of" should read --charge--; and
    Line 52, "in" should read --its--.

COLUMN 9

Line 35, "charge" should be deleted.

COLUMN 10

Line 57, "B[mAh]" should read --B[mAh],--.

UNITED STATES PATENT AND TRADEMARK OFFICE
CERTIFICATE OF CORRECTION

PATENT NO. : 5,869,949

DATED : February 9, 1999

INVENTOR(S) : TSUTOMU NISHIKAWA, ET AL.

It is certified that error appears in the above-identified patent and that said Letters Patent is hereby corrected as shown below:

COLUMN 16

Line 5, "witch" should read --switch--.

COLUMN 17

Line 3, "an" should read --a--;
    Line 13, "an" should read --a--;
    Line 28, "an" should read --a--;
    Line 40, "an" should read --a--; and
    Line 54, "an" should read --a--.

Signed and Sealed this

Seventh Day of December, 1999

*Attest:*

Q. TODD DICKINSON

*Attesting Officer*     *Acting Commissioner of Patents and Trademarks*